United States Patent [19]
Lamping et al.

[11] Patent Number: 5,822,593
[45] Date of Patent: Oct. 13, 1998

[54] HIGH-LEVEL LOOP FUSION

[75] Inventors: John O. Lamping, Los Altos; Gregor J. Kiczales, Palo Alto; Anurag D. Mendhekar, Sunnyvale, all of Calif.

[73] Assignee: Xerox Corporation, Stamford, Conn.

[21] Appl. No.: 764,101

[22] Filed: Dec. 6, 1996

[51] Int. Cl.$^6$ ....................................................... G06F 9/44
[52] U.S. Cl. ........................... 395/709; 395/705; 395/710; 395/704
[58] Field of Search .................................... 395/709, 705, 395/500, 704, 710, 588, 676

[56] References Cited

U.S. PATENT DOCUMENTS

| | | | |
|---|---|---|---|
| 5,392,130 | 2/1995 | Mahoney | 358/400 |
| 5,448,737 | 9/1995 | Burke et al. | 395/709 |
| 5,455,898 | 10/1995 | Mahoney et al. | 395/133 |
| 5,457,799 | 10/1995 | Srivastava | 395/709 |
| 5,491,823 | 2/1996 | Ruttenberg | 395/709 |
| 5,522,022 | 5/1996 | Rao et al. | 395/140 |
| 5,606,698 | 2/1997 | Powell | 395/709 |
| 5,655,122 | 8/1997 | Wu | 395/705 |
| 5,704,053 | 12/1997 | Santhanam | 395/383 |

OTHER PUBLICATIONS

Jeffrey D. Ullman, *Principles of Database Systems*, Computer Science Press, 1980, chapter 6.

Alfred V. Aho, Ravi Sethi, and Jeffrey D. Ullman, *Compilers: Principles, Techniques and Tools*, Addison–Wesley, 1986, chapter 10.

D. F. Bacon, S. L. Graham, and O. J. Sharp, "Compiler Transformations for High–Performance Computing," *ACM Computing Surveys*, vol. 26, No. 4, Dec. 1994, pp. 345–420.

Francoise Bellegarde, "Rewriting Systems on FP Expressions that Reduce the Number of Sequences They Yield", *Conference Record of the 1984 ACM Symposium on Lisp and Functional Programming*, Austin, Texas, Aug. 6–8, 1984, pp. 63–73.

Shigeru Chiba, "A Metaobject Protocol for C++," *OOPSLA '95 Proceedings* (ACM), pp. 285–299.

Philip Wadler, "Deforestation: Transforming Programs to Eliminate Trees", in Proceedings of the European Symposium on Programming (H. Ganzinger, ed.; vol. 300 of the series *Lecture Notes in Computer Science*), Springer–Verlag, 1988, pp. 344–358.

Clifford Walinsky and Deb Banerjee, "A Functional Programming Language Compiler for Massively Parallel Computers", in *Proceedings of the 1990 ACM Conference on Lisp and Functional Programming*, Nice, France, Jun. 27–29, 1990, pp. 131–138.

(List continued on next page.)

*Primary Examiner*—Emanuel Todd Voel
*Assistant Examiner*—Tuan Q. Dam

[57] ABSTRACT

A processor is provided with a software program specifying an overall computation that includes operations. Each operation implies a set of subcomputations, without explicitly specifying a control structure for carrying out the subcomputations according to a particular sequencing. The operations include a first and a second operation, and the provided software program further specifies how the first and second operations are combined in the overall computation. For example, the first and second operations can each imply, respectively, a first and a second computational loop, the first loop including the subcomputations of the first operation, the second loop including the subcomputations of the second operation. A description of possible sequencings of subcomputations of the first and second operations is provided, to be used in implementing the specified combination of the first and second operations, the description including a set of constraints on the sequencing of subcomputations of the first and second operations. A software program is automatically generated that includes a combined operation implementing the specified combination of the first and second operations. The combined operation has a control structure for carrying out the subcomputations of the first and second operations in accordance with the constraints. This control structure can be, for example, a computational loop. If the first and second operations imply, respectively, first and second computational loops, the control structure of the combined operation can be, for example, a computational loop including a fusion of the first and second loops.

28 Claims, 9 Drawing Sheets

OTHER PUBLICATIONS

Nils J. Nilsson, *Principles of Artificial Intelligence,* Tioga Publishing Co., 1980, pp. 140–145.

R. C. Waters, "Automatic Transformation of Series Expressions into Loops", *ACM Transactions on Programming Languages and Systems,* vol. 13, No. 1, Jan. 1991, pp. 52–98.

"Aspect–Oriented Programming"(home page), available on the World Wide Web at http://www.parc.xerox.com/spl/projects/aop.

"A Very Short Position Paper on Aspect–Oriented Programming," available on the World Wide Web at http://www-.parc.xerox.com/spl/projects/aop/short–position.htm.

G. Kiczales et al., "Aspect–Oriented Programming: A Position Paper from the Xerox PARC Aspect–Oriented Programming Project," available on the World Wide Web at http://www.parc.xerox.com/spl/projects/aop/position.htm.

HIGH-LEVEL LOOP FUSION

BACKGROUND OF THE INVENTION

The present invention pertains to language compilers, preprocessors, interpreters and other language processing software for computer systems and the like, and more particularly to techniques suitable for producing, from a source code program, a compiled program that is optimized with respect to the organization of loop constructs therein.

Loops are very well understood in the computer sciences. Generally, in a loop, a processor (CPU) performs one or more operation sequences repeatedly. A loop can be specified, for example, in a source code program by explicit or implicit iterative or recursive programming constructs.

Loops occur in almost all computer programs. Thus, loop fusion is an important optimization step in modern compilers. Generally, in loop fusion, two or more loops of a source code program are combined, or fused, into a single loop of a compiled program produced from the source code program.

Loop fusion is performed to increase the computational efficiency of the compiled code. A key source of inefficiency when loops are not fused is the cost of passing data between loops when one loop writes a large intermediate data structure, and the other one reads it. This large intermediate structure acts as a buffer between the two loops: It stores up the results of the first loop until that loop completes, at which point the second loop can be started and use the results. Not only does this consume space and read and write instructions, but when the data structure is too big to fit in the cache, it also means costly cache misses.

Loop fusion can eliminate this overhead. With fused loops, as partial results are produced by the computation from one loop, they are consumed by the computation from another loop. The loop fusion effectively synchronizes the production and consumption so that there is no need for inefficient buffering.

Here is an illustrative example of loop fusion. Suppose that a, b, and c are two-dimensional arrays and it is desired to compute x=(a*b)+c, that is, to perform a computation in which each element of a is multiplied by the corresponding element of b and then each element of this result (a*b) is summed with the corresponding element of c. To be more concrete, suppose that a, b and c are the following two-by-two matrices:

$$a = \begin{bmatrix} 1 & 2 \\ 3 & 4 \end{bmatrix}$$

$$b = \begin{bmatrix} 2 & 3 \\ 4 & 5 \end{bmatrix}$$

$$c = \begin{bmatrix} 3 & 4 \\ 5 & 6 \end{bmatrix}$$

Then $$(a * b) = \begin{bmatrix} 2 & 6 \\ 12 & 20 \end{bmatrix}$$

$$x = \begin{bmatrix} 5 & 10 \\ 17 & 26 \end{bmatrix}$$

One way to compute the result x is to perform two successive loops. In the first loop, each element $a_{ij}$ of a is multiplied by each corresponding element by of $b_{ij}$ for all ij (i=1,2, j=1,2). The results $a_{ij}b_{ij}$ are stored in a temporary matrix t=(a*b). In the second loop, each element $t_{ij}$ of the temporary matrix t is summed with each corresponding element $c_{ij}$ of c for all ij (i=1,2, j=1,2), and the results are stored in x. Another, more efficient way to compute x is to perform a single loop in which the value $(a_{ij})b_{ij}+c_{ij}$ is computed directly and stored in xy for all ij (i=1,2, j=1,2). This single loop is a fusion of the first and second loops described previously. The problem of loop fusion in this example is to recognize that the first and second loops are indeed fusible and to generate an efficient single loop that constitutes their fusion.

There are two common approaches to loop fusion, which can be termed explicit loop fusion and algebraic simplification. In the explicit loop fusion approach, loops are written explicitly in a fairly low-level language, such as FORTRAN; they are analyzed in detail by a compiler to identify cases where fusion is valid, and then fusion is carried out. The limitations of this approach are that the analysis can be quite complicated, and any particular analysis will be limited, missing chances for fusion which may be critical in particular applications.

The algebraic simplification approach to loop fusion starts with the loops expressed in a high-level language, such as APL or FP, that includes a collection of high-level loop forms that each provide a particular loop structure over a particular data structure. (For example, the high-level language can provide forms for particular operations on vectors, matrices, trees, lists, sequences, or other data structures.) Such forms are combined with descriptions of the computations to be done uniformly at each part of the data structure to describe loops. Loops are then fused by application of algebraic equations that describe how computations involving several loop forms are equivalent to computations involving a single form. The limitations of this approach are that any particular algebraic reasoning system has a limited number of loop forms, and it is difficult to extend such systems or to support systems with many looping forms because there need to be algebraic equations for each possible pair of combinable loops.

SUMMARY OF THE INVENTION

The present invention introduces a new approach to loop fusion that overcomes the limitations of current approaches. This new approach is focused on explicitly characterizing, through high-level descriptions of individual loops, the possible synchronization of transfer of information between the computations in loops. An exemplary application of the new approach will be illustrated with regard to an image processing language, RG (Reverse Graphics), which has a large set of core image processing primitives that use a number of different kinds of loop structure. The inventive approach is much more suitable than the previous approaches for fusing RG loops.

More particularly, in one aspect the invention provides a method in which the following steps, here labeled (a), (b), and (c) for convenience, are performed:

(a) A processor is provided with a software program, such as a source code program, that specifies a computation (hereinafter, "the overall computation") including a plurality of operations. Each of these operations implies a set of subcomputations without explicitly specifying a control structure for carrying out the subcomputations of the set according to a particular sequencing. The plurality of operations includes a first operation and a second operation. The provided software program further specifies how the first and second operations are combined in the overall computation.

For example, the first and second operations can each imply, respectively, a first and a second computational loop, the first loop including the subcomputations of the first operation, the second loop including the subcomputations of the second operation, with neither the first nor the second operation explicitly specifying control structures for carrying out the subcomputations of their respective loops.

(b) A processor is provided with a description of possible sequencings of subcomputations of the first and second operations, to be used in implementing the specified combination of the first and second operations. The description includes a set of constraints on the sequencing of subcomputations of the first and second operations.

(c) A processor automatically generates a software program that includes a combined operation implementing the specified combination of the first and second operations. The combined operation has a control structure for carrying out the subcomputations of the first and second operations in accordance with the constraints. This control structure can be, for example, a computational loop. If the first and second operations imply first and second computational loops, the control structure can be, for example, a computational loop including a fusion of the first and second loops. The step (c) can be performed, for example, by executing with the processor of step (c) a language processing program, such as a compiler, an interpreter, a precompiler, or a preprocessor.

The invention will be better understood with reference to the drawings and detailed description below. In the drawings, like reference numerals indicate like components.

DETAILED DESCRIPTION

Figure 1:
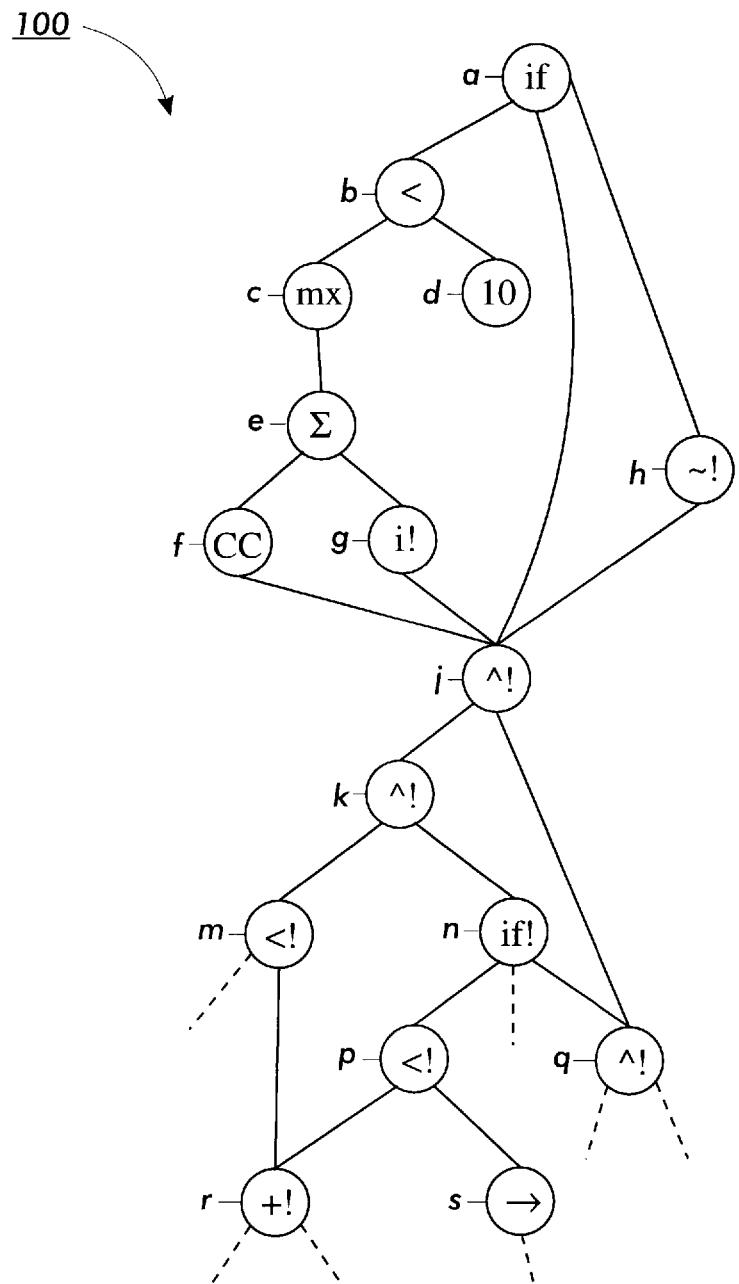
FIG. 1 shows an program graph, a directed acyclic graph (DAG) for an exemplary RG program.

A specific embodiment of the invention will now be described. This embodiment illustrates, in particular, two new techniques for loop fusion according to the invention. One new technique is describing loops in terms of high-level constraints on the order of carrying out the element operations, rather than in terms of any particular order. This allows for simple handling of complex kinds of loop fusions and allows for easy extension for new kinds of loops. The other new technique splits control information between a data flow graph and individual nodes of the graph. This allows loops to be fused while sharing the results of loops that are used several times.

The invention is well suited for implementation in the context of a compiler, interpreter, or other language processing program. In the specific embodiment that will be described, loop fusion is carried out by a preprocessor program. This preprocessor accepts RG source code, performs the loop fusion according to the invention, and produces output C code that can, in turn, can be fed into a standard C compiler.

A complete compiler that performs loop fusion must do many other activities as well, such as parsing, high-level transformations, and low-level code generation. Most of those steps can be performed by standard compilation techniques, as described, for example, in *Compilers: Principles, Techniques, and Tools* by Aho, Sethi, and UIT-man (Reading, Mass.: Addison-Wesley, 1986). Such standard techniques are outside the scope of this disclosure.

In what follows, Sections 1 through 4 of the disclosure assume that an RG source code program has been parsed into a data flow graph and that any appropriate procedure in-lining has been done on that graph. These sections describe operations particular to carrying out loop fusion on such a graph. Sections 5 and 6 then describe the larger context in which the loop-fusing preprocessor operates, including the system hardware and software and the overall processing flow from source RG code to preprocessed C code to compiled executable code. Section 7 briefly describes some alternative embodiments.

1. Overview

This disclosure describes the general organization of a loop-fusing compiler embodying the invention, a general organization that is suitable for various loop-fusion application domains. To make the discussion more concrete, the disclosure also describes how this general organization can be applied to the particular domain of fusing the RG (Reverse Graphics) image processing primitives. The parts of the disclosure that specifically pertain to loop fusion of the RG primitives will be noted.

The compilation method of the invention in the specific embodiment produces C language output programs from RG source programs. These C programs are more efficient than equivalent programs made up of series of calls to the RG library subroutines. The increased efficiency comes about because unnecessary overhead is eliminated through loop fusion. Preliminary estimates indicate that the more efficient RG implementations produced according to the invention can offer speed increases of up to an order of magnitude over comparable conventional implementations, and that the overall speed of the RG library can be increased by a factor of two or three.

1.1 The RG language and loop fusion

The RG language consists of a set of primitive operations that take pixel maps as input and return new ones as output. Examples are shifting, logical conjunction, finding connected components, and summing. Applications (that is, application programs) are written by building up successively higher level operations from these primitives. Some applications have included table detection in preparation for text recognition, and document genre detection. (Additional information about RG can be found in the Appendix that follows this Detailed Description.)

The RG language was originally implemented as a traditional subroutine library. Each primitive (see Subsection 1.3 below) of the RG library was implemented as efficiently as possible with a C routine.

While the RG primitives and their combinations provide a good framework for thinking about what an image processing program should do, they do not provide a good framework for maximally efficient implementation of that functionality. Suppose, for example, that two pixel maps are added together, and the result is added with a third. This requires two calls to the add routine and the creation of a temporary pixel map. Every pixel of the temporary pixel map gets written and then read, with the read operation probably coming after the pixel has already been flushed from the processor's cache. The total execution time is approximately twice what it would be for a single C routine that added three pixel maps. More generally, this kind of inefficiency is incurred when successive simple operations are performed. Since such operations are the norm in applications written in the RG library, this severely degrades the performance of applications.

Loop fusion can be used to improve the efficiency of RG programs. In the example above, the result of loop fusion would be a single routine that adds the three pixel maps. More generally, it is often desirable to fuse into a single loop the multiple loops corresponding to successive RG primitives, and then to do additional optimizations to eliminate redundant intermediate pixel maps.

1.2 Why use high-level loop fusion with RG?

Two serious problems that are inherent in conventional loop fusion techniques become very apparent when such techniques are used to try to optimize RG programs. By overcoming these problems, the invention helps an RG source code compiler to perform loop fusion more effectively.

The first problem with conventional loop-fusion techniques is that many of the possibilities for combining RG primitives cannot be handled in terms of loop fusion without also doing some very complicated loop rearrangements. Many RG primitives, for example, operate pixelwise on the pixel maps; they can be implemented by pixel traversals in any order. Other primitives require a particular traversal order of the pixels. They can be merged with pixelwise primitives by having the pixelwise primitive take its traversal order from the other primitive. But this requires very sophisticated loop reordering if the pixelwise primitive was defined in terms of specific loops that had a different order.

The invention uses a new approach to address this problem: The primitive operations are defined in terms of the element operations they need to carry out and explicit constraints on the order of those element operations. Loops are not explicit before or during the fusion process; there are only constraints on the execution on orders of element operations. Loop fusibility is decided in terms of constraint compatibility, using (in this embodiment) a unification algorithm. Once fusibility has been decided, actual loops are generated. This high-level approach provides a simple way of doing otherwise complicated loop fusions, and is easy to extend by adding new constraint types. Moreover, the approach can be generalized to other forms of combining partial descriptions from several parts of a program via unification.

The second serious problem with conventional loop-fusion techniques arises from simultaneously needing to satisfy two requirements on defined operations. The RG language allows applications to define new operations as combinations of other operations. Typically, applications end up with deeply nested definitions. These defined operations are viewed by the RG language as ways of naming derived pixel maps, not as procedures. In typical applications, many derived operations have very simple definitions, often including only a few primitive operations applied to some other derived operation.

The first requirement is to exploit opportunities for loop fusion across defined operations, where primitives in a defined operation are fused with primitives in an operation called by the defined operation. The second requirement is that if several places in an application request some defined operation on the same input, then the operation must be computed only once. In the prior art, the classic way of achieving the first requirement is operation definition inlining, while the classic way of achieving the second is to memorize the results of operations, and use the saved versions when they are available. But neither approach can satisfy the other requirement, and there is no straightforward way to combine them.

The invention uses a new approach to simultaneously meet these two requirements. Control information is split between the structure of a data flow graph and the nodes of the graph. Specifically, a data flow graph is built whose nodes correspond to the primitive operations. Sharing in the graph corresponds to multiple requests for the same result. Since the nodes of the graph implicitly contain loops, both they and the structure of the graph indicate control information. In particular, loop fusion is performed with respect to nodes and structure of the graph.

This novel approach leads to a number of more detailed issues, which are addressed below. The construction of the graph is in some respects analogous to common subexpression elimination; however, this is a new technique in that control issues are ignored during the elimination. Determining fusibility between nodes of the graph introduces a kind of timing constraint, which requires a new analysis. Generating the loops requires generating fused loops with multiple outputs. Finally, a control reconstruction must be performed.

1.3 The RG primitives

The RG primitives are a set of operations for image processing that operate on pixel maps (that is, arrays of pixel values). For any particular RG application program in this embodiment, the arrays are assumed to be a common size. Arrays vary in the types of values they can hold at each pixel, with the possibilities being as follows: single bits, which can be either 0 (false—a white pixel) or 1 (true—a black pixel); 8-, 16-, and 32-bit integers; and 32-bit floating point numbers. Arrays are stored in a packed representation.

The RG primitives are purely functional operations: Each primitive takes some number of pixel maps as input and returns a pixel map as output. The operations include:

Pixelwise (also called pointwise) operations, in which the output value at each pixel is a function of the input values at the corresponding pixels. The pixelwise operations that we will mention include:
+!: add two integers
−!: subtract two integers
*!: multiply two integers
/!: divide two integers
<!: compare two integers to return a boolean
i!: convert from a boolean to a 0 or 1 integer, corresponding to false and true, respectively
~!: logically negate a boolean ∧!: logically and two booleans ∨!: logically or two booleans if!: select between its second and third pixel inputs depending on whether the boolean pixel of its first input is true Project operations, which accumulate with some combining operation (i.e., some binary pixelwise operation) along a cardinal direction, placing the result of each successive accumulation in the output pixel corresponding to how far it has gotten. The example we will use is:

→: rightward summation; each output pixel is the sum of all input pixels to its left.

\* Global accumulate operations, which return a scalar result reflecting some combining operator applied to all the pixels. (In RG, global accumulate nodes can also take an additional boolean input, which acts as a mask, and accumulate only over pixels for which the mask is true. For simplicity, we will not consider this kind of node here; it raises no new issues.) The example we will use is:

mx: returns the maximum of all the pixels of the input.

Non-global accumulate operations, which take a first, index pixel map and a second pixel map and return a vector result reflecting some combining operator applied to all pixels with each index. The example we will use is:

Σ: returns a vector in which the value at each index is the sum of all pixel values of its second input for which the first (index) input has that index. In other words, suppose that $\Sigma (B,C)=A$ for 2-D arrays B, C and 1-D vector A. Then $A[i]$=the sum of all $C[x,y]$ such that $B[x,y]=i$, for all vector elements i and array indices x, y.

Opaque operators, which have complex, data dependent, control structures, not suitable for fusion. The example we will use is:

cc: computes the connected components of its inputs: it identifies each connected region of true pixels in its input, and assigns it a unique integer, and sets the corresponding pixels of the output to that integer.

Programs that use the RG operations are also free to use standard scalar operations and to use standard control structures. In particular, it is important to distinguish between the ordinary conditional, if, which takes a scalar boolean input and makes a single selection between its branches and the RG pointwise primitive, if!, which takes a boolean matrix input and makes a different selection at each pixel position.

1.4 DAG structure

The loop fusion implementation in the specific embodiment operates on a data flow graph, typically a directed acyclic graph (DAG). One such graph, which will serve as an exemplar for purposes of the discussion that follows, is illustrated as graph 100 in FIG. 1. Nodes a through s in graph 100 indicate operations on data, while edges (also called links) indicate data motion. The leaf nodes of graph 100 represent inputs to the program, while root nodes of graph 100 represent results obtained from the program. In general, child nodes supply input to parent nodes along the links.

Graph 100 is a high-level graph in the sense that a single node in graph 100 can correspond to a large-scale operation that can involve internal looping over a large-scale data structure, such as an array or a binary tree. Similarly, a single link in graph 100 can correspond to a transferal of a large-scale data structure. Other nodes and links in graph 100 can still work on scalar values, and some nodes can indicate control constructs operating at the scale of the graph.

Unlike known loop-fusion approaches, the inventive system does not try to infer a loop structure from the control structure nodes in the graph; it is only concerned with the loop structures implicit in single high-level nodes. The goal of the system is to implement the graph in such a way that a group of nodes in the graph, each of which has its own implicit looping structure, can be implemented together inside a common looping structure, thus minimizing both loop overhead and the construction and transferal of intermediate data structures.

In the case of RG, the high-level nodes correspond to the RG operations on pixel maps, and a high-level link indicates a transferal of a pixel map from one high-level node to another. The top part of graph 100 of FIG. 1 (nodes a through j, inclusive) provides an example. In the top part of graph 100, node f finds the connected components of the output of node j, node g computes the size of each connected component, and node c finds the size of the largest component. If that component has fewer than 10 pixels (node d), then the result of the DAG is the result of node j; otherwise, the result is the negation of the result of node j, reversing figure and ground.

1.4.1 The structure of nodes

As illustrated in FIG. 1, each node has a group of input ports that are points where data "arrives" and an output port where the result "departs." For example, node e has two input ports, where data from nodes f and g arrive, and an output port, where the result from node e departs toward node c. (Some kinds of nodes generate several results and have several output ports.) Each edge connects the output port of one node to the input port of another. Only one edge can enter any given input port, but multiple edges can leave from a single output port, reflecting multiple uses of the result.

The DAG serves not only to record the program structure, but also as a place to record information about the program that is gathered during the loop fusion process. Information can be recorded at both nodes and ports. A port is the logical place to store, for example, information about the nature of the data arriving or leaving from that port, such as: data type information, implementation decisions about data formats, and implementation decisions about how data will be passed. The information at the input port and output port of a link might differ, indicating, for example a need to do some format conversion before sending data on to the next node. Information stored at a node includes decisions about the timing of execution of its operation, relative to that of other nodes.

1.4.2 Kinds of nodes

The nodes can be divided into operator nodes and control nodes.

The operator nodes describe the domain-specific operators, both high-level and scalar, that do the actual computations. For RG, these nodes describe the RG primitives, as well as common operations on scalars, such as arithmetic operations.

The control operators affect what computations are done at the high level of abstraction; nodes that implicitly indicate loops are not considered control operators. In the embodiment described here, and used for RG, there are two control operators: a conditional construct and an iteration construct.

Conditional nodes (if nodes) have three inputs—a test and the two branches—and one output. These nodes select between their branch inputs based on the value of the test input.

Figure 2:
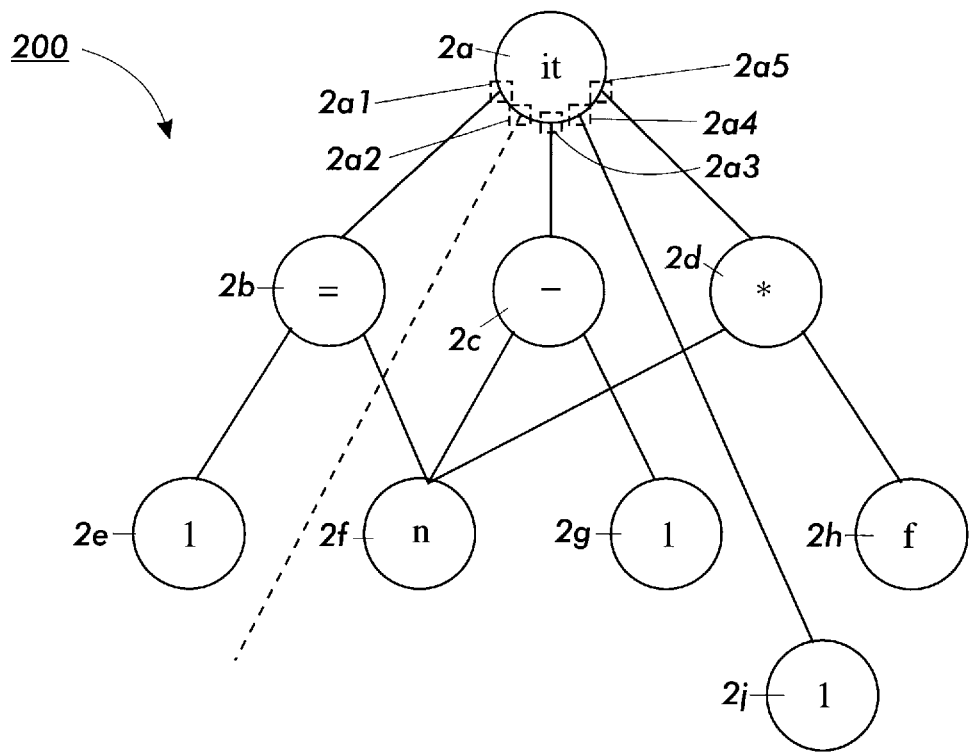
FIG. 2 shows a DAG for an exemplary iteration.

Iterations are described by iteration nodes (it nodes) and associated state variable nodes. Since they are slightly more complicated, we illustrate them first. FIG. 2 illustrates a DAG 200 for an exemplary iteration, the computation of factorial by the expression:

$f = 1;$
until $(1 = n)$ do {

$f = n * f;$ $n = n - 1$}

DAG 200 includes nodes 2a through 2j. The iteration node 2a, labeled it, has two associated state variables, n and f. Node 2a has inputs for the initial value for each state variable (respectively, the inputs indicated in FIG. 2 by the squares at 2a2 and 2a4), and it has inputs for the next values of each, (respectively, the inputs indicated by the squares at 2a3 and 2a5). Finally, the node has a test input (indicated by the square at 2a1). The final values of both n and f are available as outputs of the iteration node 2a.

In general, an iteration node for an iteration with n state values will have 2n+1 inputs and n outputs, and it will be associated with n state variable nodes, one for each state value. The inputs to the iteration node are a termination test, and n pairs of inputs, one pair for each state value, of an initial value and an iterated value. The outputs are the state values. The idea is that the subgraph connected to each iterated value port represents an expression to calculate the value for the next iteration in terms of the state variable nodes, which hold the value of the current iteration. In order to be well formed, all flow paths from the state variable nodes must terminate at the iterated value or termination test inputs of the associated iteration node.

The meaning of the iteration construct it is as follows: The iteration state is initialized with the values of the initial inputs, and each state variable node outputs the value of its state. Then the termination test is evaluated, and if true, the iteration terminates with the current state as its outputs. Otherwise, each of the iteration inputs is evaluated, all state values are updated simultaneously with those values, and the process repeats again from the termination test.

2. Issues for Fusibility

The approach of the invention involves automatic reasoning about the high-level computation(s) described in the input source code program in order to make decisions about which high-level nodes should result in fused loops, and then to synthesize those loops.

Because the computation described by a high-level node can sometimes have a complex internal structure, it turns out to be most perspicuous to reason not in terms of fusing nodes, but in terms of fusing links. Fusing a link means that the data transfer indicated by the link will happen inside a loop, rather than between loops. There are a number of conditions that must be satisfied for this to be possible, which are the focus of this Section 2 of the disclosure. We call each condition a fusibility issue.

Each of the issues can be crisply characterized in terms of a constraint system, with one constraint system per issue. Each constraint system deals with a different property of ports or nodes. Deciding fusibility then becomes a matter of choosing a solution to all the system of constraints.

For each fusibility issue, the constraints can be divided into two kinds: mandatory constraints, which must always be satisfied; and optional constraints, which must be satisfied if particular links are to be fused. The mandatory constraints most commonly depend on properties of nodes and of how the nodes relate to their respective ports. The optional constraints typically are equality constraints, saying that some pair of property values must be the same for the link to be fused.

In this embodiment there are four fusibility issues. Each issue leads to mandatory and optional constraints associated with that issue. (For convenience, we designate the constraints for each issue by a particular letter of the alphabet.) Briefly, the four issues are:

A—constraints on order of data access

C—loop organization constraints imposed by the code generator

D—demand constraints

T—timing constraints

The remainder of this section addresses the issues one by one, first giving an informal description of each issue and then presenting the constraint system for each issue. The constraint system determines the problem that the fusion is trying to solve. The next section (Section 3) will the address the question of actually finding a solution that maximizes the number of fusible loops.

In discussing constraints, we will need to refer to nodes and their ports. Arbitrary nodes will be designated by variables such as n. Arbitrary ports will be designated by variables such as p. Ports on nodes will be designated with variables such as $n_o$ for output ports and $n_I$ for input ports, with indices, such as $n_{I1}$ and $n_{I2}$, being used to distinguish different ports of the same kind on the same node. The value of a constrained variable will be denoted by terms such as $A(p)$, $C(n_{Ii})$, $T(n)$, and $D_x(n_o)$, where the first letter indicates the issue to which the constraint pertains.

2.1 Order of Data Access

As mentioned earlier, a motivation for fusing loops is to avoid the explicit construction and access of a large intermediate result that acts as a buffer between the loops. Getting rid of this buffer means that results produced by the first loop must be consumed by the second loop soon after they are produced. That is what loop fusion does; it synchronizes the production and consumption of the parts of the intermediate result so that there is no need for a large data structure to hold the entire result.

This observation provides a basis for analyzing the fusibility of loop constructs in this embodiment: For a loop that produces a large structured value to be fusible with a loop that consumes that large structured value, the two loops must be able to produce and consume the components of the value in approximately the same order. The tightest fusion is possible when each component is consumed as soon as it is produced. But it can also be the case that a small batch of components must be produced before any can be consumed, in which case the loops can still be fused at the granularity of the batches. Other possibilities can arise in other application domains.

In general, there can be several different loop implementations of a given high-level construct, each such implementation using a different order of access. According to the invention, a loop-fusing compiler first decides the orders of access of the high-level nodes from among the possibilities, choosing the order of production for each output port and the order of consumption for each input port. It attempts to choose these in a way that maximizes the number of links for which the producer and consumer have similar orders. The high-level nodes on either side of such links become candidates for being in the same fused loop.

In the case of RG, the high-level constructs fall into two broad categories: those, such as the determination of connected components, which produce and consume in a highly specialized order, and those, such as pointwise operations and accumulates, that can operate in pretty much any order, as long as it is the same order on all their inputs and outputs. The latter constructs can be made compatible with any other construct. A important refinement in the case of RG is to recognize that most pointwise operations on bit pixel arrays are efficient only if they operate on a word of bits at a time, and so words of bits should be treated as batches and fusion done at a level that operates on words of bits at a time, rather than on individual bits.

We formalize this order of data access with an order of traversal property associated with each port of each node. This property represents the order in which inputs are read from the port or the order in which outputs are generated at a port. The property values are domain-specific, reflecting the orders of data access that make sense for a particular application domain. The values are ordered in a hierarchy.

Figure 3:
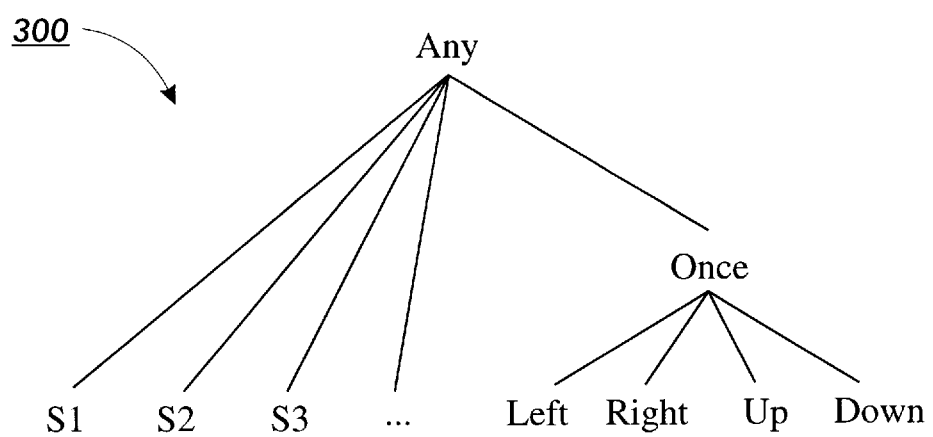
FIG. 3 illustrates a hierarchy of order-of-traversal property values for RG.

For RG, the hierarchy 300 is as shown in FIG. 3. The categories are assorted special orders, S1, S2, etc., about which nothing is known, plus orders that are known to visit each pixel exactly once, of which the two dimensional scans where the innermost loop is in any of four directions (left, right, up, down) are particularly significant. There are actually two different versions of each of the four directional orders, one for accessing an element at a time and one for accessing a word of bits at a time. But there is no need to track this difference explicitly, since accesses to bits are always done a word at a time.

The mandatory constraints are domain-specific, and imposed by nodes, indicating the kinds of access patterns for which there are implementations. By themselves, the mandatory constraints can always be satisfied, since each constraint only deals with its own node's ports.

For RG, the mandatory constraints imposed by the various kinds of nodes are:

Pointwise Operations: Pointwise operations have no predetermined order of traversal and hence can synchronize with any other traversal order, but inputs and outputs must have the same order. We also require that the order be one that accesses each location only once: $A(n_o)=A(n_{Ik})$ for every input port $n_{Ik}$ of the node and $A(n_o)<=Once$.

The inequality, $A(n_o)<=Once$, in the above equation says that access pattern for $A(n_o)$ must by any of the patterns below "Once" in hierarchy 300.

[Note: It will be appreciated by those of skill in the art that the equality and inequality symbols, such as =, >=, and <=, can have different meanings in different contexts and can be used to represent relations other than simple arithmetical relations. In particular, these symbols can be used to represent relations of ordering or partial ordering. Thus, for example, the symbol <=, which in some contexts can be read as "less than or equal to," in other contexts can be read as "precedes or is ordered the same as" and in still other contexts as "is lower than or equal to in the hierarchy." Accordingly, here and throughout the discussion of this Section 2, it should be kept in mind that the meaning of a symbol is determined by the context in which it appears.]

Opaque loop structures: These are operations whose traversals are determined entirely by the input data, and there is little hope of fusing loops. Here we have the constraints:
$A(n_o)=S_0$ and $A(n_{Ik})=S_k$, for every input port $n_{Ik}$ of the node, where each $S_k$ is a different special-order, and does not occur in the rest of the graph.

Project nodes: These nodes have one of four different project-orders: left-to-right, right-to-left, bottom-to-top, top-to-bottom. Moreover, the input and the outputs are traversed in the same order. Therefore, we have:
$A(n_o)=A(n_{I1})=d$, where d is one of four project-orders depending on the direction of scan.

Accumulate nodes: Both accumulate nodes and global accumulate nodes can traverse their inputs in any order, provided it is the same order for both, but produce their output in a special, data-dependent order. Therefore, we have:
$A(n_o)=S$ where each S is a unique special order, and does not occur in the rest of the graph, $A(n_{I1})<=$ Once, and $A(n_{I1})=A(n_{I2})$ if there are two inputs.

In terms of the nodes a through s of graph 100 of FIG. 1, the ports of each node representing an RG primitive will get some mandatory constraints. Some representative ones are:

$A(e_{I1})=A(e_{I2})<=Once\ A(e_o)=S1$ $A(f_I)=S2\ A(f_o)=S3$ $A(p_{I1})=A(p_{I2})=A(p_o)<=Once$ $A(r_{I1})=A(r_{I2})=A(r_o)<=Once$ $A(s_I)=A(s_o)=Right$ Notice how new Si values are generated each time one is called for.

In contrast to the domain-specific mandatory constraints, such as the constraints for RG specified above, the optional constraints are domain-independent and very simple. In order for fusion to occur along edge (p, q), it is necessary to satisfy:

$A(p)=A(q)$.

Thus, for example, to fuse along the link between nodes p and s in FIG. 1, the equation $A(p_{I2})=A(s_o)$ would have to be added, leading to the conclusions that $A(p_{I1})=A(p_{I2})=A(p_o)=Right<=Once$. This, including the last inequality, is consistent, so access order is not a constraint on fusion between nodes p and s. On the other hand, fusion is not possible between nodes e and f, because the (optional) constraint $A(e_{I1})=A(f_o)$ would have to be added, leading to the conclusion that $S3=A(f_o)=A(e_{I1})<=Once$, But S3 is not situated below "Once" in the hierarchy 300 of FIG. 3, so this is a contradiction.

In some cases, fusion is possible along either of two links, but not both. For example, in FIG. 1, if node r were a leftward projection, then we would have that $A(r_o)=Left$, and it would be possible to fuse node p with either node r or node s, but not both, since fusing with both would yield the contradiction: $Left=A(r_o)=A(p_{I1})=A(p_{I2})=A(s_o)=Right$.

2.2 Loop Organization

Even if it is possible for the order of production and consumption across a link to be the same, the code generator may have technical problems synthesizing a loop that subsumes both production and consumption.

In generating a loop that computes the fused computations of several nodes, each node will typically contribute some code for the body of the loop. But the overall loop control structure cannot be partitioned out so easily. In this embodiment, the code-generation approach is object-oriented, with the loop structure being generated by sending a message to one node-object that is given overall charge for the loop. (There may also be subsidiary inner loops under the charge of other node-objects.) This means that in order for successful generation of code for fused nodes, we must be able to choose one node to be in overall charge of the fused nodes, and also to choose any nodes to be in charge of subsidiary loops.

There are constraints on which nodes can be in charge. For some high-level constructs, such as RG's connected components (cc) construct, the code generator only knows how to generate code if they are in charge of the overall loop. These typically correspond to nodes with complex loop structures; they can incorporate other computations, but they cannot run as part of any other loop.

Other high-level constructs, such as most RG pointwise constructs, are happy to be in the charge of others. The code generator simply generates code that operates inside the loop structure imposed by the node in charge.

For still other high-level constructs, such as RG's pointwise comparison construct, the node can both be in the charge of another overall loop control structure and be, itself, in charge of a subsidiary loop with some other nodes in its charge. This typically happens, as in this case, when the construct deals with batches of result components on some ports and individual result components on others. Code for the construct can be generated to operate inside a batch-wise loop, with the construct generating an interior loop to iterate over the individual results.

We use equality constraints to capture which nodes are in charge of others. There is a slight complication since nodes that are in charge of inner loops are also under the charge of other nodes. To be able to accommodate this situation, responsibility is actually assigned to ports, rather than to nodes. In particular, a port is assigned responsibility for some collection of ports. (If a port is assigned responsibility for any other ports, it will always be assigned responsibility for itself.)

In the code generator, the node of a port that is in charge of other ports is responsible for generating the control code for the loop that includes all nodes with ports it is in charge of. Those other nodes are only responsible for generating code to run inside that loop. Most nodes will have all their ports under the same charge, but nodes that are in charge of inner loops will have some of their ports under the charge of the outer loop, and others of their ports in charge of the inner loop.

In order to fuse loops represented by nodes that share a link, the two ports on the link must be under a common charge, because they must be in the same loop.

To formalize all this, we associate a responsibility property with each port of each node. This property value is a port whose node will be in charge of generating the loop code that controls the data crossing the port.

The mandatory constraints on loop organization are domain-specific, and imposed by nodes. Some nodes indicate that they must be in charge of the iteration of certain ports, while other nodes indicate that several of their ports must all be under the charge of the same iteration code. By themselves, these constraints can always be satisfied, since each mandatory constraint only deals with its own node's ports.

For RG, the mandatory constraints imposed by the various kinds of nodes are:

Pointwise Operations: Most pointwise operations can be in the charge of any loop construct, but all their ports must be in charge of the same construct:

$C(n_o)=C(n_{Ik})$ for every input port $n_{Ik}$ of the node.

A few pointwise nodes, however, such as numeric comparisons and pointwise conditionals with numeric results, mediate between word-wise and element-wise access orders. They do so by introducing an interior loop that does a word's worth of element-wise accesses for each word of bit accesses. Thus, they must be in charge of the element-wise orders. Comparison nodes are in the charge of their output, and take charge of their inputs. The constraints for them are:

$C(n_{I1})=C(n_{I2})=n_{I1}$.

The output and conditional input of pointwise conditional nodes can be in the charge of other nodes, but the pointwise take charge of their other inputs. That is, they call them based on their conditional data. The constraints for these nodes are:

$C(n_o)=C(n_{I1})$, $C(n_{I2})=n_{I2}$, and $C(n_{I3})=n_{I3}$, where $n_{I2}$ and $n_{I3}$ are the two branches of the conditional.

Closed loop structures: These operations have complicated control structures, and must be in charge:

$C(n_o)=n_o$ and $C(n_{Ik})=n_{Ik}$, for every input port $n_{Ik}$ of the node.

Project nodes: These nodes do not need to be in charge.

$C(n_o)=C(n_{I1})$

Accumulate nodes: These nodes do not need to be in charge of their input, but must be in charge of their output. If they have two inputs, they must be under the same charge:

$C(n_o)=n_o.C(n_{I1})=C(n_{I2})$ if there are two inputs.

In terms of graph 100 of FIG. 1, the ports of each node representing an RG primitive will get some mandatory constraints. Some representative ones are:

$C(e_{I1})=C(e_{I2})$  $C(e_o)=e_o$
$C(f_I)=f_I$  $C(f_o)=f_o$
$C(m_{I1})=C(m_{I2})=m_{I1}$  $C(m_o)=M_o$
$C(n_{I2})=n_{I2}$  $C(n_{I3})=n_{I3}$  $C(n_o)=C(n_{I1})$
$C(p_{I1})=C(P_{I2})=p_{I1}$
$C(r_{I1})=C(r_{I2})=C(r_o)$
$C(S_I)=C(S_o)$

The optional constraints are domain independent. In order for fusion to occur along edge (p, q), it is necessary for the data to be under the same charge:

$C(p)=C(q)$.

For example, to fuse nodes p and r in graph 100 of FIG. 1, the equation $C(p_{I1})=C(r_o)$ would have to be asserted, leading to the conclusion that $C(p_{I1})=C(r_o)=p_{I1}$. Similarly, fusing nodes m and r would lead to $C(m_{I2})=C(r_o)=m_{I1}$. Either of these is possible, but they cannot both be done. That reflects the requirement of both nodes m and p to be in charge of generating the loop code for processing their inputs, and they cannot both be if m, p, and r are all fused into one loop.

2.3 Demand 2.3.1 Conditional Demand

Figure 4:
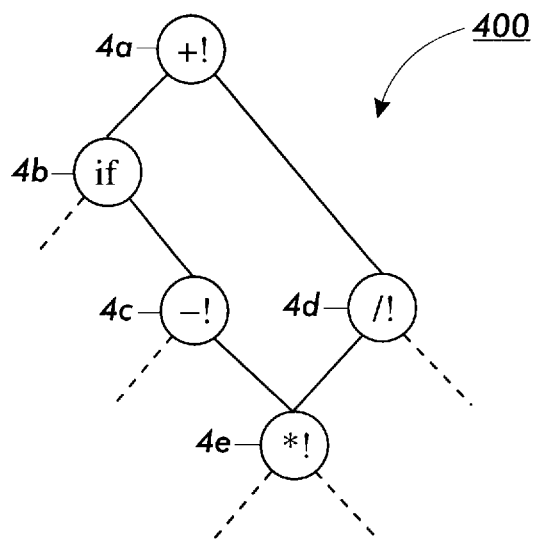
FIG. 4 shows a DAG illustrating an exemplary demand constraint.

To understand the constraints that demand places on fusion, consider the example of graph 400 in FIG. 4, which uses an if control node and some pointwise RG primitives: +!, −!, *!, and \!. In graph 400, node 4c only needs to be evaluated if it is selected by the conditional node, 4b. Node 4e, on the other hand, always needs to be evaluated, since its value is also needed by node 4d, whose value is always needed by node 4a.

Thus, it is problematic to fuse along the edge between nodes 4c and 4e in graph 400. The resulting loop would have to be executed whenever the result of graph 400 is needed, but that will result in unnecessary computations of the value of node 4c in those cases where the conditional goes the other way. Assuming that such unnecessary computations are undesirable, the conclusion is that nodes 4c and 4e should never be fused. A similar situation arises between nodes h and j in graph 100 of FIG. 1, since the value of node j will always be needed, but the value of node h will only be needed in certain circumstances. Again, the conclusion is that the two nodes should not be fused. In general, if the value of one node is not needed in exactly the same circumstances as when it is requested by another, then the two nodes should not be fused.

In order to allow for the demand for an if node's value to be different from the if node's demands for its inputs, we associate demand with ports, rather than nodes. We formalize this by introducing a property, $D_c(p)$, called the conditional demand of a port, to capture the conditions under which data needs to be passed across the port. Links where the ports have different conditional demands should never be fused, unless unnecessary computation is acceptable.

The conditional demand on a port is domain-independent. It is either the constant 1, indicating that demand is always present; or it is a set $\{<n_1,b_1>, <n_2,b_2>, \ldots\}$ of pairs of the form <if node, condition sense>, indicating demand for data whenever there is demand for the output port of one of the if nodes $n_i$ and the test input for that node $n_i$ returns $b_i$ (where $b_i$ can be either true or false).

The mandatory constraints for conditional demand describe how demand is passed down the graph and modified at if nodes.

For every output port, p, if p is a root of the computation then

Dc(p)=1.

while if p is not a root then $D_c(p)=UD_c(q)$ (Unioning over all input ports, q, connected to p, and performing the simplifications $<n,true>U<n, f>=D_c(n_o)$ and $xU1=1$.)

For each node, n, if n is not an if node then $D_c(n_o)=D_c(n_{Ik})$ for every input port $n_{Ik}$ of the node.

while if n is an if node then $D_c(n_o)=D_c(n_{I1})$, $D_c(n_{I2})=\{<n,true>\}$, $D_c(n_{I3})=\{<n,false>\}$, where $n_{I1}$ is the conditional input, and $n_{I2}$ and $n_{I3}$ are the two branches (representing, respectively, the true and false outcomes of the conditional).

These equations completely determine Dc(p) for each port, passing information down the graph.

If a link (p, q) is to be fused, then it is necessary to also satisfy the optional constraint $D_c(p)=D_c(q)$ In terms of graph 100 of FIG. 1, some of the equations are $D_C(a_O) = 1$     $D_C(a_{I1}) = D_C(a_O)$  $D_C(a_{I2}) = \{<a, true>\}$  $D_C(a_{I3}) = \{<a, false>\}$ $D_C(b_O) = D_C(a_{I1})$     $D_C(b_{I1}) = D_C(b_{I2}) = D_C(b_O)$ $D_C(c_O) = D_C(b_{I1})$     $D_C(c_{I1}) = D_C(c_O)$ $D_C(e_O) = D_C(c_{I1})$     $D_C(e_{I1}) = D_C(e_{I2}) = D_C(e_O)$ $D_C(f_O) = D_C(e_{I1})$     $D_C(f_{I1}) = D_C(f_O)$ $D_C(g_O) = D_C(e_{I2})$     $D_C(g_{I1}) = D_C(g_O)$ $D_C(h_O) = D_C(a_{I3})$     $D_C(h_{I1}) = D_C(h_O)$ $D_C(j_O) = D_C(f_{I1}) \cup D_C(g_{I1}) \cup D_C(a_{I2}) \cup D_C(h_{I1})$ from which we can conclude $D_C(g_{I1}) = D_C(g_O) = D_C(e_{I2}) = D_C(e_O) = D_C(c_{I1}) =$ $D_C(c_O) = D_C(b_{I1}) = D_C(b_O) = D_C(a_{I1}) = D_C(a_O) = 1$ $D_C(f_{I1}) = D_C(f_O) = D_C(e_{I1}) = D_C(e_O) = D_C(c_{I1}) =$ $D_C(c_O) = D_C(b_{I1}) = D_C(b_O) = D_C(a_{I1}) = D_C(a_O) = 1$ $D_C(h_{I1}) = D_C(h_O) = D_C(a_{I3}) = \{>a, false>\}$ and then $D_C(j_O) = 1 \cup 1 \cup <a, true> \cup <a, false> = 1$ Thus nodes h and j cannot be fused, because node j's value is demanded more often than node h needs it.

2.3.2 Iteration Demand

There is a similar notion of demand stemming from iteration nodes. The issue here is that a node that does not belong to an iteration should not be fused with one that does, or the first node will get unnecessarily re-executed each time the iteration runs. This would trivial to deal with, except that the data flow graph does not explicitly delimit what nodes belong to a particular iteration. Instead, the nodes that belong to an iteration are simply those that depend on any of the variables of the iteration.

This is formalized with the iteration demand on a port, $D_I(p)$. This domain-independent property is the set of iteration nodes whose iterations the port is logically inside of. Put another way, it is the iterations which might make the data on the port change.

For each node, n, if n is not an iteration node or state variable node then $D_I(n_o)=UD_I(n_{Ik})$(unioning over all input ports, $n_{Ik}$, of the node.

while if n is a state variable node then $D_I(n_{oj})=\{m\}$ where m is the iteration node associated with n.

and if n is an iteration node then $D_I(n_{oj})=UD_I(n_{Ik})-\{n\}$ (unioning over all input ports, $n_{Ik}$, of the node.)

For every input port, p, $D_f(p)=D_f(q)$, where q is the output port connected to p.

These equations, again, completely determine $D_f(p)$, but this time passing information up the graph. If a link $(m_o, n_{Ik})$ is to be fused, then it is necessary to also satisfy the optional constraint $$D_f(m_o)=D_f(n_o)$$

Note that this constraint relates two ports not on the same link.

2.3.3 Partial Demand

Finally, there is another kind of demand that can be important. Some high-level constructs, such as RG's point-wise conditional, if!, do not require all parts of all their inputs. RG's if!, for example, requires any given pixel from only one of its branches, the one specified by its condition. Seen in terms of entire high-level data structures, an if! node creates conditional demand for all of its inputs, but seen in terms of the individual components of those structures, it creates demand for only some of the elements of each of its inputs. We call this fine-grained demand partial demand.

Loop fusion provides a chance to exploit partial demand, because if a node that has demand for only part of one of its inputs is fused with the node producing that input, only the demanded part of the value will actually be computed. But partial demand also results in a constraint on the fusion of loops, because if other nodes want the entire output, it will not have been correctly computed.

To see this more concretely, suppose that nodes n and q in graph 100 of FIG. 1 were fused. Node n would be in charge of generating the control structure for the fused loops, and it would arrange to call the computation from node q only on those pixels for which the right hand side of n's branch is selected. Part of the computation of q would also write the computed pixels into an explicit data structure, for eventual use by node j. But since the computation from q was called on only some pixels, the data structure would only contain valid data for those pixels, and so node j would get invalid data.

To avoid this problem, a partial demand property, $D_p(p)$, is introduced for every port. This domain-dependent property describes what parts of the value actually need to be passed across the port for the computation to succeed.

In the RG application domain, $D_p(p)$ is either the constant 1, indicating demand for all pixels, or it is a set $\{<n_1,b_1>, <n_2,b_2>, \ldots\}$ of <if node, condition sense> pairs, indicating demand for a given pixel whenever there is demand for that pixel on the output port of one of the if nodes, $n_i$, and the test input for that node on that pixel returns $b_i$.

The propagation of partial demand in RG is complicated somewhat by the various ways that different node types affect it. Here are its mandatory constraints.

For every output port, p, if p is a root of the computation then $$D_p(p)=1.$$

if p is not a root then $D_p(p)=UD_p(q)$ (Unioning over all input ports, q, connected to p, and performing the simplifications $<n,true>U<n,false>=D_p(n_o)$ and $xU1=1$.)

For each node, n, if n is not a pointwise node then $D_p(n_{Ik})=1$ for every input port $n_{Ik}$ of the node.

if n is a pointwise node but not an if! node then $D_p(n_o)=D_p(n)$, for every input port $n_{Ik}$ of the node.

if n is an if! node then $D_p(n_o)=D_p(n_{I1})$, $D_p(n_{I2})=\{<n,true>\}$, $D_p(n_{I3})=\{<n,false>\}$, where $n_{I1}$ is the conditional input, and $n_{I2}$ and $n_{I3}$ are the two branches.

These equations completely determine $D_p(p)$ for each port, passing information down the graph. If a link (p, q) is to be fused, then it is necessary to also satisfy the optional constraint $$D_p(p)=D_p(q)$$

In terms of graph 100 of FIG. 1, the interesting equations involve nodes j, n, and q:

$D_p(j_o)=1$ (inferrable from the portion of graph 100 above node j)

$D_p(j_{I1})=D_p(j_{I2})=D_p(j_o)$ $D_p(n_{I3})=\{<n,false>\}$ $D_p(q_o)=D_p(j_{I1})UD_p(j_{I2})$ from which we can infer that $D_p(q_o)=1U\{<n,false>\}=1$ Hence, nodes n and q cannot be fused, because $D_p(q_o)$ is different from $D_p(n_{I3})$.

2.4 Timing

Figure 5:
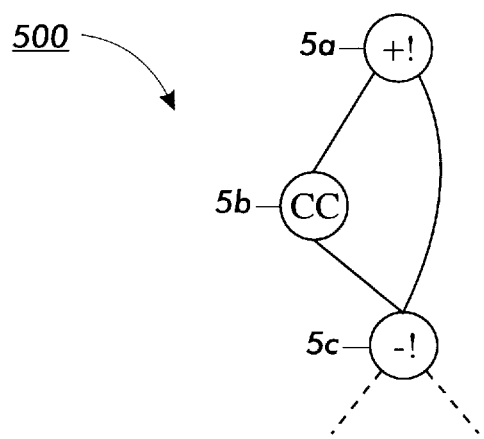
FIG. 5 shows a DAG illustrating an exemplary timing constraint.

There is an additional constraint in this embodiment, illustrated in FIG. 5. The CC node (node 5b) of graph 500 cannot be fused with any of the other nodes, because it has such a complex loop structure that fusion does not ever make sense. On the other hand, the +! and −! nodes (respectively, nodes 5a and 5c) are candidates for fusion as far as all the previous criteria are concerned. But that is impossible. Consider the fused loop consisting of the +! and −! nodes. One of its inputs comes from the cc node, so the fused loop cannot run until after the cc node has run; but the cc node has an input that comes from the fused loop, so the cc node cannot run before the fused loop runs. In short, there is no way to order the computation.

In general, it is illegal to do a fusion that would cause one of the inputs of the fused loop to depend, possibly indirectly, on a loop output. Another way of saying this is that it must be possible to assign a time ordinal to every node in the graph, such that fused nodes have the same time ordinal and all unfused links go from a node with an earlier ordinal to a node with a later ordinal.

To determine timing compatibility, there is a time property T(n) associated with each node, n. (In this embodiment, the time property is the only property to be placed on nodes, rather than on ports.) The time property represents the time step in which a node computes its results, compared to when other nodes compute theirs. For purposes of the time property, we assume a coarse granularity of time steps, so that a node consumes its inputs and produces its output all in the same time step. Thus the values of the time property are simply integers.

The mandatory constraints associated with the time property are domain-independent, and simply indicate that data must be ready by the time step in which it is used. For all links $(n_o, m_i)$:

$$T(n)<=T(m)$$

The optional constraints here are also domain-independent, but have a new twist. There is one constraint that must be asserted to fuse a link, and another to not fuse a link. In order for fusion to occur along link $(n_o, m_1)$, it is necessary to satisfy:

$T(n) >= T(m)$ while for fusion not to occur along the link, it is necessary to satisfy $T(n) < T(m)$ That is, fused loops must operate in the same time step, whereas a loop must operate at a later time step than any of its unfused inputs.

Turning again to FIG. 1, for nodes j, k, n, and q of graph 100, we have the mandatory constraints $T(j) >= T(k)$
$T(k) >= T(n)$
$T(n) >= T(q)$ We further know independently that nodes n and q cannot be fused, so we have $T(n) > T(q)$ from which can conclude $T(j) > T(q)$ Thus nodes j and q cannot be fused, even though they could be fused insofar as the A, C, and D constraints are concerned.

3. Constraint Satisfaction

The constraint system set up above is sufficient to tell when loop fusion is possible, but the compiler needs a strategy for solving the constraints, preferably in a way that leads to as much fusion as possible. Thus the constraint satisfaction algorithm's task is to make a set of fusion decisions such that all the constraints resulting from the decisions and the initial constraints are consistent (solvable), preferably also maximizing the amount of fusion. Although complicated optimization strategies might be necessary to get the absolute maximum amount of loop fusion, the approach used in the specific embodiment is based on a simple greedy algorithm that still finds most opportunities for fusion. In particular, the constraint solver is greedy for the A, C, and D constraints (although not for T constraints). More sophisticated approaches can be used if maximum performance is critical.

A key observation behind our solution strategy is that the timing constraints (T constraints) are significantly different from the other constraints (A, C, and D constraints) in that they are the only ones that introduce an additional optional constraint for when there is no fusion. This means that the algorithm must treat the timing constraints a bit differently from the others.

Figure 7:
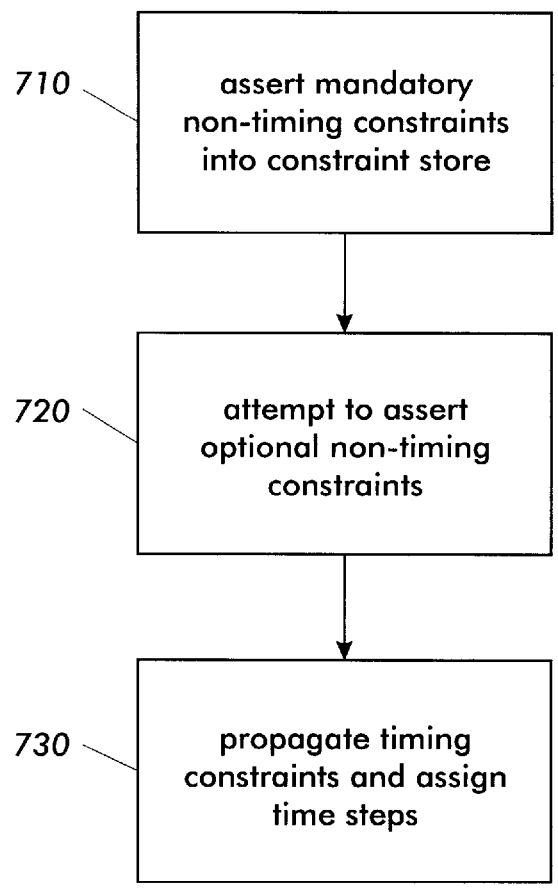
FIG. 7 is a flowchart of the steps in the constraint satisfaction algorithm used to determine, from a DAG, what is fusible, and to annotate the DAG accordingly.

The constraint satisfaction algorithm follows the steps illustrated in the flowchart of FIG. 7. First, all mandatory constraints, except for tiling constraints, are asserted into a constraint store (step 710). Then each link in the DAG is checked to see if its optional constraints, other than timing constraints, can be satisfied; if so, these constraints are added to the store (step 720). Then the timing constraints are propagated and, in particular, time step assignments are made for each node (step 730). These steps will now be discussed in more detail. (Discussion of how the code generation steps of FIG. 7 fit into the larger process of compiling a source code program in this embodiment will be taken up in Section 5 below.)

As a first step, the constraint satisfaction algorithm asserts all the mandatory constraints, except the timing constraints, into a constraint store (step 710). The essential component of the constraint store is a unification algorithm to propagate equality constraints. The only non-equality constraints are comparisons to constants, which can be checked for consistency during unification.

A word should be said at this point about unification, and about the unification algorithm used in this embodiment and its relation to the constraint satisfaction algorithm as a whole. Unification is a technique for ensuring the consistency of equality constraints. This technique can be modified to also ensure the consistency of other kinds of constraints, too. For some of the fusibility issues encountered in loop fusion, all the constraints are equality constraints, and the constraint satisfaction algorithm is simply unification. For other issues, there are inequality constraints, but, for this embodiment, they are used in a special way: the possible values fit into a classification hierarchy, as illustrated in FIG. 3, and the inequality constraints are all of the form that says that the value must lie in one part of the hierarchy. That is, being lower in the hierarchy 300 corresponds to being lower in the partial order for that hierarchy, and the inequalities are always of the form that a variable must be below a specified point of the hierarchy. Rather than recording a value, if present, for a variable, the unification algorithm records a current bound on the variable. When a unification of two variables is attempted, rather than checking for equality of values, if present, their bounds are compared for compatibility (for being equal or for one containing the other). If they are incompatible, the unification fails. If they are compatible, the unification succeeds, and the bound for the unified variable is the more precise of the two original bounds.

In this embodiment, the unification algorithm runs as a procedure, the unifier, that is called by the constraint satisfaction algorithm. The unifier is fed a set of new constraints resulting from a proposed loop fusion and, in effect, is asked by the constraint satisfaction algorithm, "Can we do this self-consistently?" The unifier checks the proposed new constraints against the set of all previously accepted constraints, which are in the unifier's constraint store. If consistent, the unifier adds the new constraints to its store; otherwise, it does not. The constraint satisfaction algorithm, being greedy, tries for every link to post the constraints needed to unify that link. It does this for all links of the DAG.

The unifier in this embodiment is used to unify the A, C, and D constraints, which are equality relations or are simple inequalities relating a variable to a constant, but not for the T constraints, which are not all of this form and would thus require a more complicated unification algorithm.

Continuing in FIG. 7, after the mandatory, non-timing constraints have been asserted, the constraint satisfaction algorithm checks each link, one by one, against the constraint store to see if the optional constraints needed to fuse the link, other than timing constraints, can be satisfied (step 720). If so, it adds those constraints to the store and marks the link as possibly fusible. Otherwise it marks the link as not fusible.

Now, only the timing constraints (T constraints) need to be considered (step 730). Rather than storing these constaints explicitly in a constraint store, as was done for the A, C, and D constraints, a special-purpose algorithm is used: The graph is traversed, depth first, and a time step is calculated for each node. The time step of a leaf node is 0, and the time step of a non-root node is the maximum of the time steps of all nodes immediately below it on possibly fusible links and one more than the time steps of all nodes immediately below it on non-fusible links. Now all links for which the nodes on either side have the same time step are the ones to fuse.

These is a simple optimization that can generate additional fusions in some cases: If assigning a node a higher time-step number would allow the node to fuse with nodes above it, and would still leave the node with a lower time-step number than that of any not-possibly-fusible node above it in the DAG, then the node can be assigned the higher number if that assignment will lead to more fusions.

Figure 6:
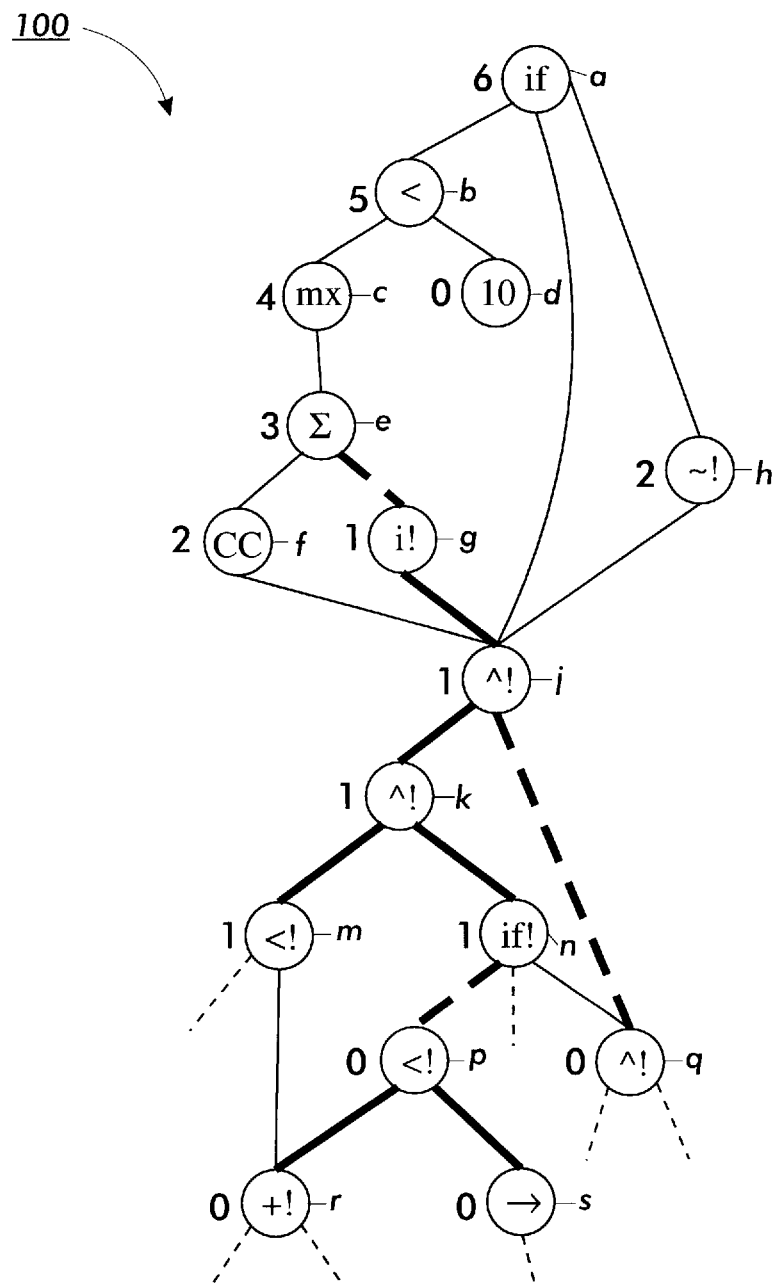
FIG. 6 shows an annotated DAG corresponding to the original DAG of FIG. 1.

Turning now to FIG. 6, an annotated graph 100', similar to graph 100 of FIG. 1, is shown. The annotations of annotated graph 100' show the results of the constraint satisfaction algorithm as applied to graph 100. The fusible links are shown as bold lines in annotated graph 100'. Specifically, the links between the following pairs of node are fusible: g and j; j and k; k and m; k and n; p and r; p and s. There is some choice available about what to fuse, since, for example, the link between the nodes m and r could have been marked possibly fusible if the link between nodes p and r had not been. It is just a matter of which link got its optional constraints asserted first during execution of the constraint satisfaction algorithm.

The time step assignments are also shown in FIG. 6, by boldface numbers (from 0 through 6) written to the left of each node in annotated graph 100'. Each node's time step is represented by its corresponding number. For example, nodes f and h are assigned time step 2, node e is assigned time step 3, and node a is assigned time step. (Nodes that do not have descendants in annotated graph 100' are treated here as leaf nodes, and accordingly are assigned time step 0.) The result of the time step assignments and the propagation of the timing constraints is to disallow three fusions that would otherwise have been possible, as indicated by the bold dashed lines in annotated graph 100'. Specifically, the links between the following pairs of nodes are marked as having fusion disallowed: e and g; j and q; n and p. These fusions were, in fact, marked as possible before step 730, but were disallowed in step 730.

4. Code generation

Code generation is dependent on the application domain and on the target language (that is, the language of the generated code) as well. This section of the disclosure describes an approach to code generation that can be applied to various application domains and target architectures. The code generator's basic job is to carry out the decisions made in the loop fusion analysis.

Figure 8:
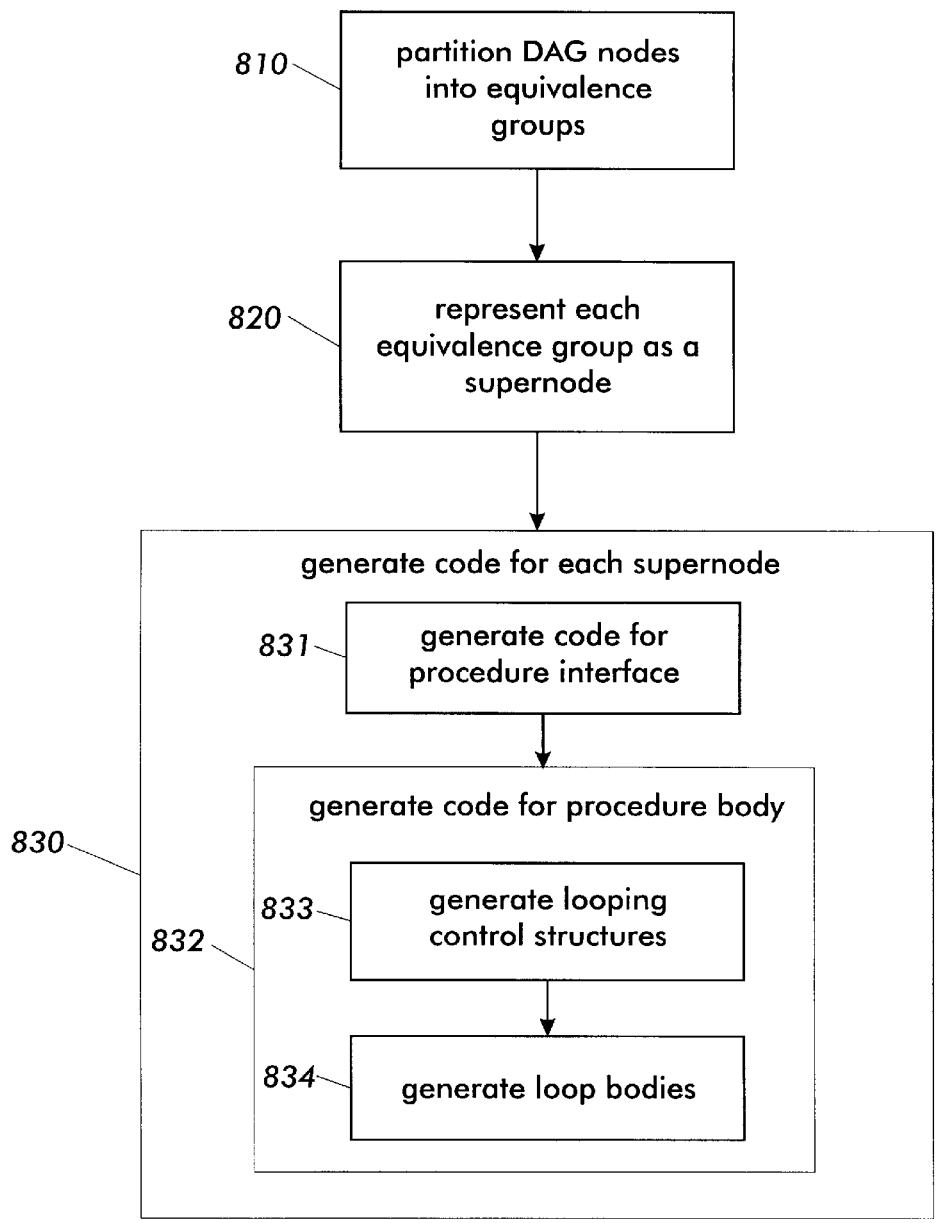
FIG. 8 is a flowchart of the steps of code generation from the annotated DAG.

The code generator follows the steps illustrated in the flowchart of FIG. 8. First, the DAG nodes are partitioned into equivalence groups (step 810). Then, a supernode is created to represent each equivalence group (step 820). Finally, each supernode is implemented (step 830) by generating interface code (step 831) and procedure body (steps 832, 833, 834). These steps will now be discussed in more detail. (Discussion of how the code generation steps of FIG. 8 fit into the larger process of compiling a source code program in this embodiment will be taken up in Section 5 below.)

First, the fusibility relation is used to partition the DAG nodes into equivalence groups (step 810). That is, the nodes in each equivalence group are nodes connected by links to be fused, and every link to be fused is a link that goes between nodes that are in a common equivalence group. Each of the equivalence groups is implemented as a unit. Of the nodes in graph 100 of FIG. 1, given the fusion decisions reached above as shown in annotated graph 100' of FIG. 6, there are two non-trivial equivalence groups, namely the group of nodes {g, j, k, m, n} and the group of nodes {p, r, s}.

Then a new supernode is created to represent each equivalence group (step 820). The supernode has an input port for each distinct input to the group and an output port for each distinct output coming from the group. Each supernode replaces in the DAG the nodes of the equivalence group that it represents.

The remaining task is to implement each supernode: to generate, for each supernode, a procedure that implements the computation specified by the equivalence group (step 830). This task is subdivided into a simple part, namely, generating the interface code for the procedure (step 831), and a more complex part, namely, generating the body of the procedure (step 832) along with the looping control structures and the bodies of the loops (respectively, steps 833 and 834).

The purpose of the interface code (generated in step 831) is to get data into and out of the rest of the procedure. To accomplish this, the interface code has to have an input for each input port of the supernode and an output for each output port of the supernode. (For a target language, such as C, that does not conveniently support multiple outputs from a single procedure, the outputs can be encoded as by-reference input parameters, that is, as input parameters passed by reference rather than by value.) The interface code also needs to set up variables that will be used inside the body of the procedure to refer to each of the inputs and outputs. (Often these variables will just be the procedure arguments.) The names of the variables are recorded in association with the ports in the DAG that correspond to input or output from the supernode. These names become the way that code inside the procedure body accesses the external data.

That leaves the more involved problem of generating (in step 832) the code for the body of the procedure. The body consists of a loop control structure plus code to be executed inside the loop. But the code to be executed inside the loop can itself contain subsidiary loops. So the strategy is to determine a tree of nested looping structures (step 833) and then to generate loop bodies (step 834) starting from the leaves of the tree and working up toward the root, with the subsidiary loops becoming part of the bodies of the higher level loops.

The subsidiary loop structure has already been captured by the information computed earlier concerning which nodes are in charge of which other nodes (see Subsection 2.2 above). In particular, each node that has one or more ports that have been assigned responsibility for other ports corresponds to a loop structure, and nodes whose ports are in the charge of the "in-charge" node indicate code to be executed in the body of the loop.

The responsibility ("in-charge") information must first be recomputed, however, because the constraint satisfaction process may have unified such information for inks that ultimately (i.e., after constraint satisfaction was done) were not fused. So a new constraint store is set up, the mandatory loop organization constraints are added to it, and then optional loop organization constraints are added for each link that was actually decided to be fused.

Once the responsibility information is recomputed, a cluster is created for each node in the group that is in charge of other nodes. There is thus one cluster for each looping structure. Every node with a port in its charge is put in the cluster. If there are ports not in the charge of any node, a special cluster is created to hold all the nodes of such ports. When there is more than one cluster, the clusters intersect at those nodes that have both a port in charge of other ports and a port in the charge of another port. These intersections induce the tree structure on the clusters corresponding to nested looping structures.

The clusters are now visited in a bottom-up order. For each cluster, the task is to generate the loop structure for that cluster's loop and to generate the code for inside the loop. As mentioned earlier, the node whose ports are in charge of the cluster determines the looping structure, while the remaining nodes of the cluster contribute code for the body of the loop.

The looping structure is responsible for generating code that sets up variables to indicate which component of the data structure is being processed by the loop at the current iteration. For RG, for example, the loop structure sets up pixel indices. The exact information provided by the indicator variables can depend on the granularity of traversal, but the granularity was agreed to earlier, during constraint satisfaction, so that code now generated for the body of the loop can be assured that the information that it needs will be available.

To generate the code for the body of a cluster's loop, two queues are first established: a queue to hold statements for the body of the cluster, and a queue to hold temporary variables. Then each node of the cluster is visited, in depth-first order relative to the original DAG. Each node of the cluster is processed in three stages, as follows:

The first stage identifies an expression, for each of the node's input ports that is in the charge of the cluster, to compute the current iteration's part of the value of the port. If the link to the input port comes from outside the cluster, this is a data-structure access based on the loop iteration information. If the link to the input port comes from inside the cluster, this is an expression for computing the iteration's part of the value of the output port linked to the input port, an expression that will have been generated earlier in the processing for the cluster.

The second stage of processing a node is to generate, for each of the node's output ports that is in the charge of the cluster, an expression to compute the value of the current iteration's part of the value of the port. That expression is recorded in association with the output port. Typically, the expression is some operation involving the expressions for the input ports of the node. It can also involve some operations that have side effects in which the appropriate statements are generated and placed in the queue of statements for the cluster.

The third stage again visits each of the node's output ports that is in the charge of the cluster, this time looking at the links going out of the port. If there is more than one link going out of the port, it is necessary to arrange that the node's computation not be repeated, by storing the result of the node's computation in a temporary variable. In more detail:

Code for a temporary variable is generated and put on the queue of temporary variables for the cluster.

An assignment is generated from the expression to compute the part of the port's value into the new temporary, and put on the queue of statements for the cluster.

The expression to compute the part of the port's value is changed into a reference to the temporary variable.

Once any necessary temporary variable has been inserted, this third stage checks to see whether there is a link from the output port to outside of the cluster. If so, code is generated to store the current part of the port's value into the output data structure.

Once all the nodes of the cluster have been processed, the node in charge of the cluster is visited again. (It may not have been the last node processed, since some of its outputs may link to other nodes in the cluster.) Now the actual loop code is generated, based on the kind of node, incorporating the code from the loop body queue and the expressions for its input ports, wrapping the whole thing in the temporary declarations from that queue. The same process is followed if there is no node in charge of the cluster, except that the loop structure is determined from the traversal order of the ports in the cluster. (They will all be the same.)

If this is the top-level cluster, then the generated loop code is placed in the procedure body. Otherwise, the generated code is saved with the node, and produced when the node is visited by the cluster that is in charge of it, as part of the code to be executed inside that higher-level cluster's loop.

5. Method Steps

In the specific embodiment, loop fusion is carried out by a preprocessor program that operates as the "front end" portion of an overall RG compilation process. This is depicted schematically in FIG. 9. Front-end preprocessor 910 accepts an RG-language source code program 901 as input, performs loop fusion as described above, and generates as output a C-language program 902 in which the loops have been fused. The output C code can, in turn, can be fed to a conventional C compiler 950 that operates as the "back end" of the compilation process. Typically, the C compiler produces an executable binary machine-language program 903 for a particular target machine. When the C program output by the front-end preprocessor is fed directly as input to the back-end compiler, the overall result is a transformation from the RG-language source code program to an executable binary in which the loops have been fused-in short, a compilation of the RG source code.

Figure 10:
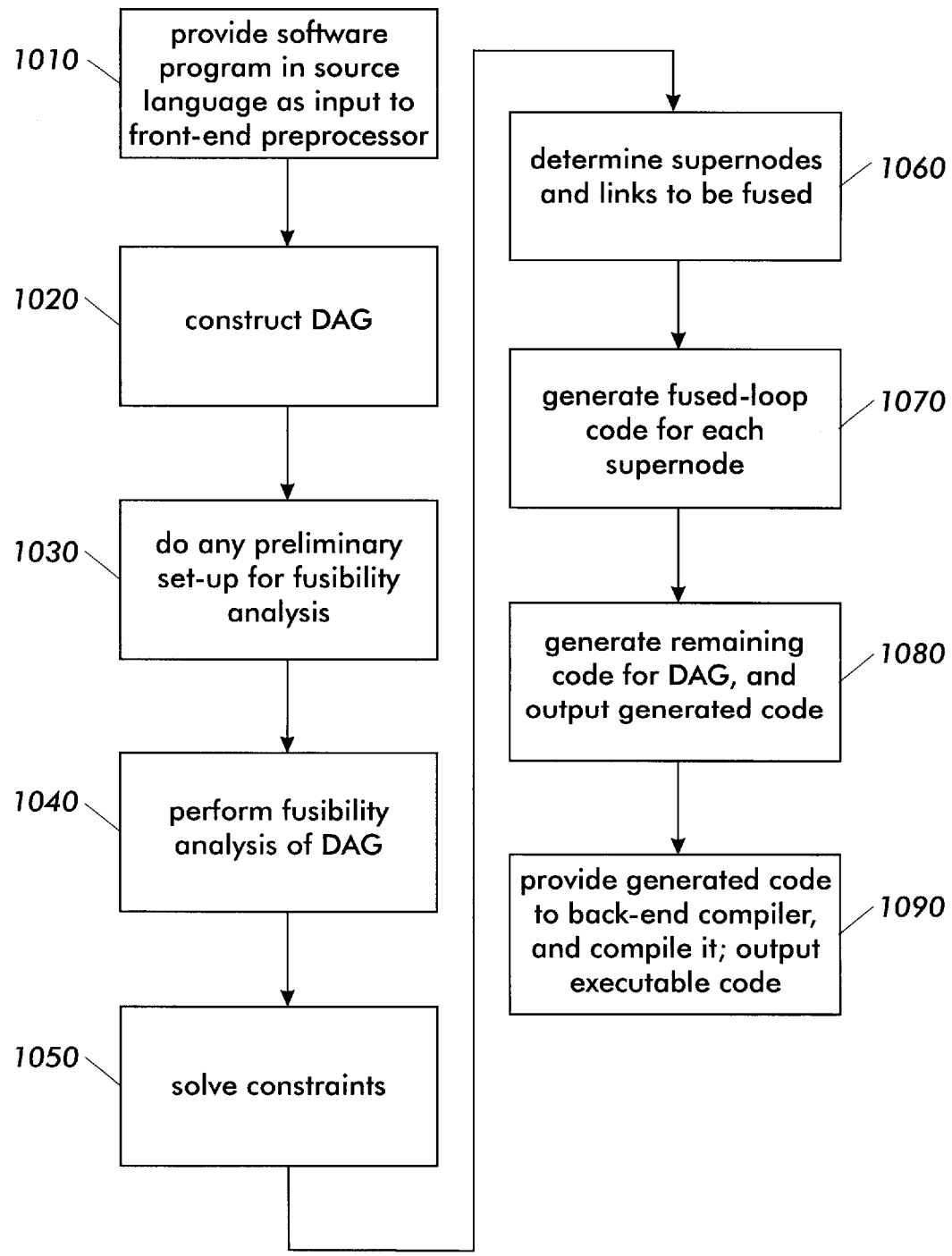
FIG. 10 shows the overall flow of program transformation in a two-phase preprocessor-compiler that performs loop fusion according to the invention.

The steps in the overall RG-to-C-to-executable process are illustrated by the flowchart of FIG. 10. A source code program written in the RG language is input to the front-end preprocessor (step 1010). From the input RG source code program, a program graph—a DAG—is constructed (step 1020). The DAG can be constructed using techniques that are well understood for compilers. Graph 100 of FIG. 1 is an example of a DAG that can be produced in step 1020.

In this embodiment, the DAG is represented computationally as a collection of related objects, the word "objects" being used here in the sense of "object-oriented programming" as is well understood in the art. Each node, link, and port in the DAG is represented by an object. Each type of object (node-object, link-object, port-object, etc.) has a set of associated object properties that can be used to maintain information associated with the object. Object properties can be used, in particular, to maintain information about fusibility issues for ports and nodes, and also about the fusibility determinations made for links.

Once the DAG has been constructed, any preliminary set-up or precomputations needed for the fusibility analysis can be done (step 1030). This depends on the specifics of the particular embodiment; it can include, for example, any implementation decisions that may affect what implicit loops there are to be fused, or in general any other decisions to be made prior to beginning the loop fusion analysis.

Next, an analysis of the nodes, links, and ports of the DAG is made with respect to the four fusibility issues (A, C, D, and T) that were described in Section 2 above (step 1040). The nodes and ports of the DAG are marked—that is, their object properties are updated—to reflect the results of this analysis. In particular, ports are marked with their respective order of traversal, responsibility, and partial demand properties, and nodes are marked with their respective time properties. This analysis, in effect, determines the mandatory and optional constraints.

Next, the constraint satisfaction algorithm described previously in Section 3 is performed (step 1050). Steps 710, 720, and 730 of FIG. 7 are all performed as part of this step 1050.

The mandatory constraints other than the timing constraints are then posted to the constraint store (step 710). In this embodiment, knowledge of the mandatory A, C, and D constraints is built into the preprocessor; this includes both domain-independent mandatory constraints and mandatory constraints specific to the RG application domain. Note that although the constraints are posted to the constraint store at this step, these mandatory constraints are guaranteed to hold, so that unification is guaranteed at this point. Note also that in some embodiments, the mandatory constraints are posted to the constraint store as the DAG is being analyzed, rather than determiming the constraints first and then posting them as is done here.

In this embodiment, the constraint store is represented in a distributed manner by a collection of constraint objects (A, C, and D objects). In other embodiments, a separate data structure or structures can be used to represent the constraint store.

After the mandatory constraints are all posted to the constraint store, the optional constraints posted to the constraint store and are solved (in this embodiment, by unification) so as to maximize the possibilities for loop fusion (step 720). Finally the time steps are assigned in accordance with the timing constraints (step 730).

As a result of step 1050, an annotated DAG, such as graph 100' of FIG. 6, is produced. From this annotated DAG, the preprocessor gathers and organizes the links to be fused and the nodes that can be combined into supemodes (step 1060). The preprocessor then generates code for the fused loop for each supernode (step 1070). This is the code generation process described previously in Section 4; accordingly, steps 810, 820, and 830, including the constituent steps 831 through 834 of step 830, are performed as part of step 1070. (Note that in generating the code, it is not necessary actually to rebuild a modified DAG in which the supernodes are actually instantiated as node-objects; it suffices to determine which supernodes could be constructed, and then to generate the code that such supernodes would represent. This is the approach followed in the specific embodiment.)

Besides the code for the fused loops, the preprocessor also generates code for the rest of the DAG (step 1080). This includes, but is not limited to, code to support the connections between the various fused loops.

The output of step 1080 is a program in the C language that has fused loops and that implements the functionality of the original RG source code. This C program can then be provided to the back-end C compiler for compilation into executable code (step 1090). Alternatively or additionally, it can be stored on-line or off-line for later use, transmitted via a computer network to a remote site, printed out, etc.

6. System Components

The components of a hardware and software system suitable to the specific embodiment of the invention will now be described. Apart from the software that actually implements high-level loop fusion according to the invention, the system components will be familiar to and readily understood by persons skilled in the art.

Generally speaking, the overall compilation method illustrated in FIG. 10 can be carried out using any appropriate general-purpose computer or combination of computers, such as a collection of computers interconnected by a computer network or the like. For example, source code programs can be preprocessed and compiled on a suitably programmed general-purpose computer, and the resulting output can then be executed on a target system. The general purpose computer used for compilation can be, for example, a mainframe computer, workstation, or personal computer. Typically it includes a processor (CPU) that is operatively coupled to a memory (e.g., RAM), a persistent storage device (e.g., a hard disk), and user interface hardware, such as an alphanumeric keyboard and a pointing device (e.g., a mouse) for input and a display screen (e.g., CRT) for output. The general purpose computer has an operating system, and can run application programs in the context provided by the operating system. In particular, a front-end RG preprocessor and a back-end C compiler can run as such application programs. The target system can be, for example, a collection of computers linked together by a communications medium such as a network. Any of a wide variety of distributed computation systems, including but by no means limited to the Internet and corporate intranets, can serve as the target system for the executable code.

Figure 11:
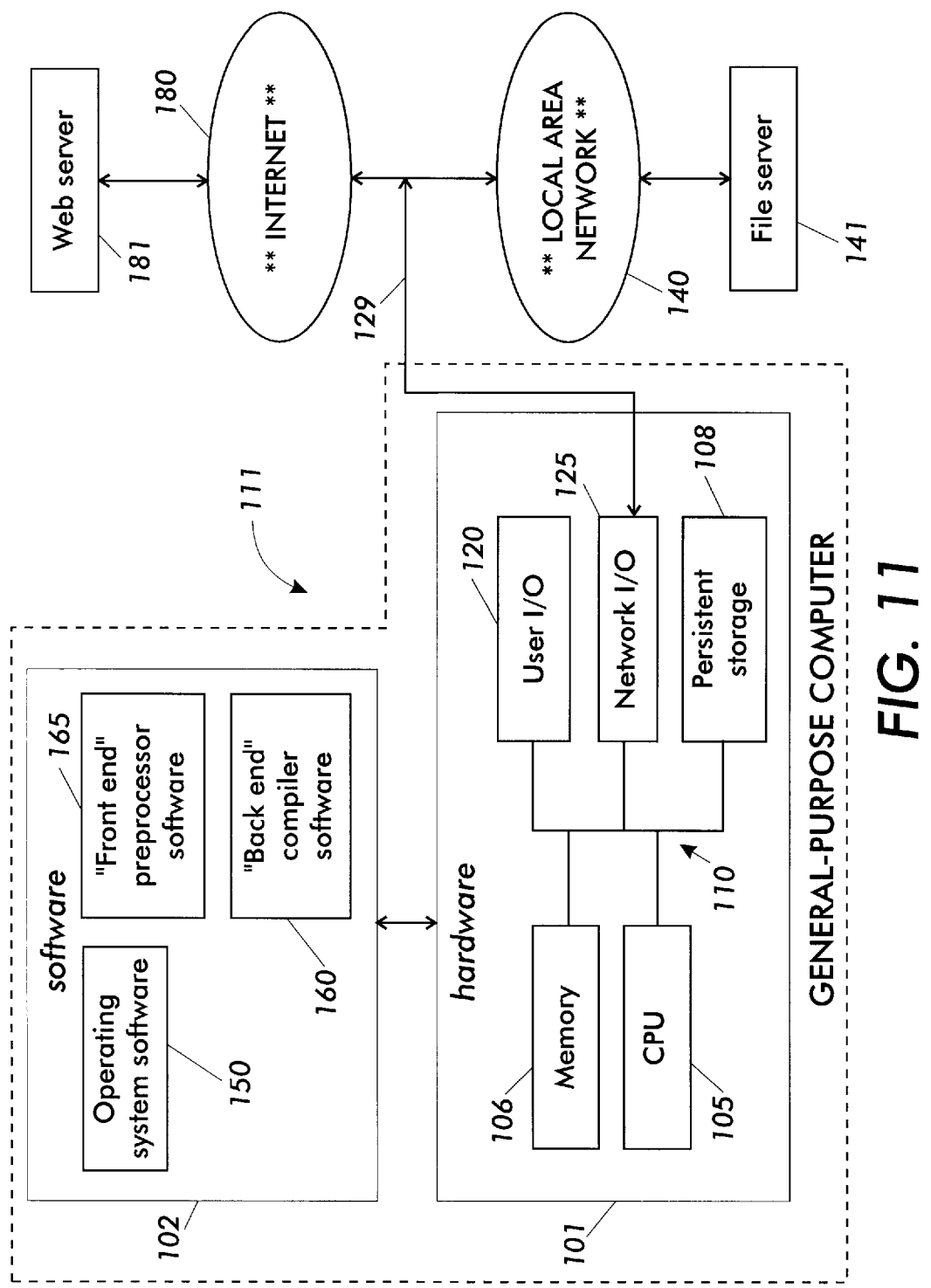
FIG. 11 is a diagram of a hardware and software system suitable to an embodiment of the invention.

FIG. 11 shows hardware and software components of an exemplary system suitable for performing the steps of the flowchart of FIG. 10. The system of FIG. 11 includes a general-purpose computer 111 connected by one or more communication pathways, such as connection 129, to a local-area network (LAN) 140 and also to a wide-area network, here illustrated as the Internet 180. Through LAN 140, computer 111 can communicate with other local computers, such as a file server 141. Through the Internet 180, computer 111 can communicate with other computers, both local and remote, such as World Wide Web server 181. As will be appreciated, the connection from computer 111 to Internet 180 can be made in various ways, e.g., directly via connection 129, or through local-area network 140, or by modem (not shown).

Computer 111 is a personal or office computer that can be, for example, a workstation, personal computer, or other single-user or multi-user computer system; an exemplary embodiment uses a Sun SPARC-20 workstation (Sun Microsystems, Inc., Mountain View, Calif.). For purposes of exposition, computer 111 can be conveniently divided into hardware components 101 and software components 102; however, persons of skill in the art will appreciate that this division is conceptual and somewhat arbitrary, and that the line between hardware and software is not a hard and fast one. Further, it will be appreciated that the line between a host computer and its attached peripherals is not a hard and fast one, and that in particular, components that are considered peripherals of some computers are considered integral parts of other computers. Thus, for example, user I/O 120 can include a keyboard, a mouse, and a display monitor, each of which can be considered either a peripheral device or part of the computer itself, and can further include a local printer, which is typically considered to be a peripheral. As another example, persistent storage 108 can include a CD-ROM (compact disc read-only memory) unit, which can be either peripheral or built into the computer.

Hardware components 101 include a processor (CPU) 105, memory 106, persistent storage 108, user I/O 120, and network interface 125. These components are well understood by those of skill in the art and, accordingly, need be explained only briefly here.

Processor 105 can be, for example, a microprocessor or a collection of microprocessors configured for multiprocessing. It will be appreciated that the role of computer 111 can be taken in some embodiments by multiple computers acting together (distributed computation); in such embodiments, the functionality of computer 111 in the system of FIG. 11 is taken on by the combination of these computers, and the processing capabilities of processor 105 are provided by the combined processors of the multiple computers.

Memory 106 can include read-only memory (ROM), random-access memory (RAM), virtual memory, or other memory technologies, singly or in combination. Memory 106 can be used, in particular, for working storage and can contain the constraint store; the DAG, including objects that represent links, nodes, and ports; etc.

Persistent storage 108 can include, for example, a magnetic hard disk, a floppy disk, or other persistent read-write data storage technologies, singly or in combination. It can further include mass or archival storage, such as can be provided by CD-ROM or other large-capacity storage technology. (Note that file server 141 provides additional storage capability that processor 105 can use.) The preprocessor and compiler programs as well as the input RG source code, preprocessor output C code, and compiler output binary code can all be stored with persistent storage 108.

User I/O (input/output) hardware 120 typically includes a visual display monitor such as a CRT or flat-panel display, an alphanumeric keyboard, and a mouse or other pointing device, and optionally can further include a printer, an optical scanner, or other devices for user input and output.

Network I/O hardware 125 provides an interface between computer 111 and the outside world. More specifically, network I/O 125 lets processor 105 communicate via connection 129 with other processors and devices through LAN 140 and through the Internet 180.

In the specific embodiment, computer 111 can be used to perform both the front-end preprocessing that includes the inventive loop fusion and the back-end C code compilation. Alternatively, computer 111 can be used to perform the front-end processing only, and the resulting output (that is, a C-language software program with fused loops) can be stored in persistent storage 108, and also can be transmitted to other processors and devices outside computer 111 through LAN 140 and the Internet 180.

Software components 102 provide computer 111 with the capability of performing high-level loop fusion according to the invention. Software components 102 include an operating system 150 and a set of application programs that can run as tasks under control of operating system 150. In particular, the application programs include front-end preprocessor program 160 and back-end compiler software 165. Operating system 150 also allows processor 105 to control various devices such as persistent storage 108, user I/O 120, and network interface 125. Processor 105 executes the software of operating system 150 and its tasks 160, 165 in conjunction with memory 106 and other components of computer system 111.

In this embodiment, the inventive high-level loop fusion is provided primarily by front-end preprocessor program 160, which carries out loop fusion on an input source code program according to the steps described above with reference to FIG. 10 and the accompanying text. The input source code program can be provided from any number of sources. In particular, it can be retrieved from persistent storage 108 or file server 141, or downloaded from the Internet 180, e.g., from Web server 181.

7. Variations and Extensions 7.1 Language extensibility

The inventive technique of describing loop fusion in terms of fusibility constraints, including constraints on the control structure of the fused loops, provides a way of allowing efficient extensibility of the range of language constructs that can be fused. According to the invention, adding a new construct to a programming language requires only describing its constraints, not relating it to each prior language construct. Thus it becomes easy to extend a language while maintaining the advantages of loop fusion.

For example, suppose a new global operation were added to RG that summed the values of each row of pixels, returning a vector with the sum for each row. According to the invention, extending the RG language with this new operation requires only two things: (1) providing a straightforward definition of how to do the accumulation called for by the new operation; and (2) expressing the operations constraints on the order of traversal: row by row, with any order within a row and between rows. These two things, in conjunction with the constraints already expressed for the original RG operations, enable loop fusion with the compatible operations, such as pointwise operations and horizontal scans.

7.2 Alternative embodiments

Figure 9:
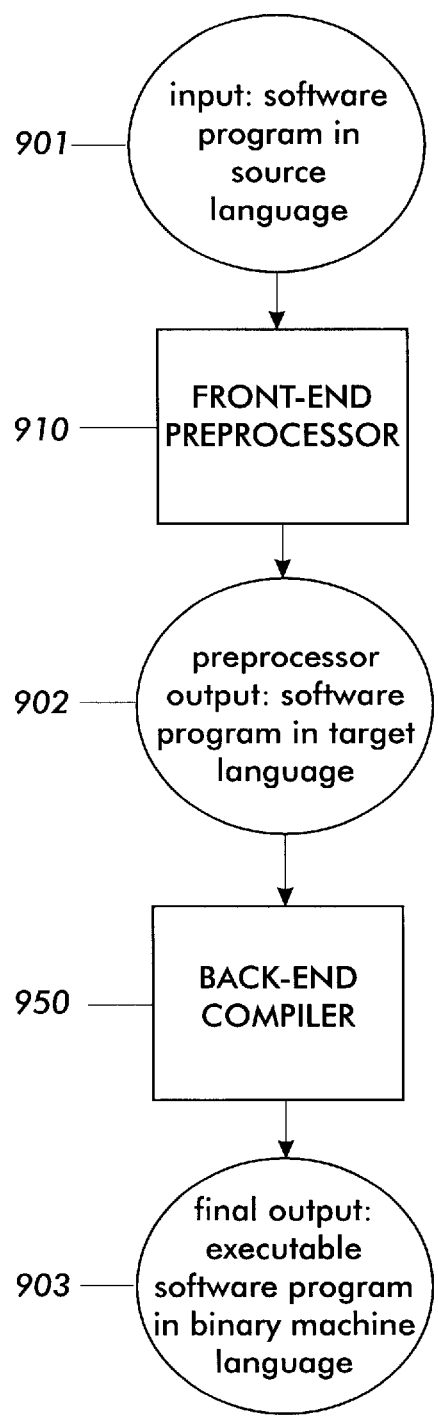
FIG. 9 schematically depicts how the two-phase preprocessor-compiler transforms a source code program into an executable binary.

It will be appreciated that although the specific embodiment that has been described accepts RG input and produces C output from the front-end preprocessor and machine-language output from the back-end compiler, the invention is by no means limited to RG input or to C language or machine-language output. In general (and as shown in FIG. 9), the input to the preprocessor is a software program in a source language, and the output from the preprocessor is a software program in a target language. Any programming language that supports high-level constructs which imply loops can be used as the source language, and any number of programming languages can be used as the target language. The source and target languages can in some embodiments be one and the same language.

Further, it will be appreciated that although the specific embodiment that has been described adopts a two-phase approach to compilation, a single-phase approach is also possible. To wit, a compiler can be built that compiles RG source code directly into machine code, performing the inventive loop fusion in the process. This requires only that the code generator (see Section 4 above) generate executable code rather than C code.

Moreover, the invention is not restricted to compilers, precompilers, or preprocessors. It can also be used, for example, with interpreters that execute source code directly rather than converting it into machine code to be executed later. In general, many kinds of computer-language processing programs can benefit from the loop fusion techniques that have been described.

As indicated earlier, the system configuration is not limited to that shown above. For example, a single processor can perform both the loop fusion and the rest of the preprocessing, compilation, or other language processing sequence; or the task can be shared among two, three, or many processors, as will be apparent to those of skill in the art.

The fused loops emitted by the code generator can be implemented in serial by a single processor or, if the target machine supports parallel execution, in parallel by multiple processors.

In the specific embodiment above, the loop-fusing preprocessor accepts the RG source code program as its input, and automatically determines the constraints based on its own "built-in" knowledge of constraints, in particular, the domain-specific constraints pertinent to RG. In other embodiments the constraints for various domains can be parameterized and made available to the loop-fusion engine; for example, a single preprocessor can be built that will perform loop fusion for source code programs in a variety of programming languages, so long as the parameters for the particular language at hand are provided. In still other embodiments, some of the constraints can be indicated manually (by a human being) rather than automatically. For example, a human can annotate the source code program to indicate a preference that certain loop fusions be performed. In this way, the human can indicate fusions that are specific to a particular source code program or a particular circumstance in which the compiled program is to be run.

In RG, the large-scale operands that provide the implicit loop operations to be fused are typically arrays and vectors. However, the invention can be used to fuse implied loops derived from any large-scale operands, that is, any operand having smaller constituent components. This includes, but is not limited to, lists, sequences, trees, binary trees, vectors, matrices, arrays, objects, object hierarchies, etc. etc.

The constraint solver described above uses a unification algorithm. Other constraint-solving algorithms can also be used in some embodiments. Also, the order-dependent greedy constraint solving algorithm described above can be replaced with more sophisticated constraint-solving techniques. In particular, whereas the simple greedy algorithm simply attempts to fuse the most links possible, other things being equal, more sophisticated metrics for optimizing loop fusion can be used.

In conclusion, a new method for high-level loop fusion has been described. The inventive method can be embodied in any suitable hardware configuration and can be applied to build software development tools including, but not limited to, compilers and interpreters.

The foregoing description illustrates just some of the uses and embodiments of the invention, and many others are possible. Accordingly, the scope of the invention is not limited by the description, but instead is given by the appended claims and their full range of equivalents.

APPENDIX: MORE ABOUT RG

Following is some further information about the RG language. Although the terminology used in this Appendix differs somewhat from that used in the main portion of the description above (for example, "add" instead of "+!," "labelcc" instead of "cc," etc.), the intent will be readily apparent to those of skill in the art.

RG (for reverse graphics) is a high-level language for writing programs that analyze and interpret 2-D binary, graphic images. For example, RG enables an ordinary programmer—someone not an expert in computer vision, pattern recognition, or any related field—quite easily to write a program that extracts the heights of the bars in a simple bar chart. (As examples of image processing applications in which RG can helpfully be used, see U.S. Pat. No. 5,455,898, Mahoney et al., entitled "ANALYZING AN IMAGE SHOWING A GRAPHICAL REPRESENTATION OF A LAYOUT," U.S. Pat. No. 5,392,130, Mahoney, entitled "ANALYZING AN IMAGE SHOWING A ROW/COLUMN REPRESENTATION," and also U.S. patent application Ser. No. 08/503,746, a continuation of application Ser. No. 08/158,062, now abandoned, Rao et al., entitled "ANALYZING AN IMAGE SHOWING A PARALLEL LENGTH GRAPH"; all of which are commonly assigned with the present invention.)

RG is designed to make application programs as concise, parsimonious, and efficient as possible.

Conciseness: In RG, it usually doesn't take much code to achieve an interpretation of a graphic image similar to that of a human observer.

Parsimony: RG's small, fixed set of primitive operations supports a wide range of complex image analysis applications.

Efficiency: One does not pay a significant penalty in time or space performance for writing an application using RG rather than writing it using other available image analysis tools.

RG provides concise expression and parsimony by means of a signal-based image analysis methodology. RG is signal-based in that it provides a single data abstraction, which all its primitive operations consume and produce, and this abstraction preserves spatial information pointwise. (Roughly, we can think of RG as a language for operating on spatially registered 2-D arrays.) The uniform use of a single data abstraction provides parsimony, because routines written in RG are arbitrarily composable; the fact that this data abstraction is effectively pointwise provides concise expression because many 2-D geometric computations have their simplest form when decomposed into pointwise subproblems. RG is efficient because its implementation provides several key performance optimizations, some based on its unique data representation.

RG is implemented as an embedded language: It adds a set of primitives to some existing high-level programming language, such as C or Lisp. Thus, RG needs to provide very few programming constructs beyond those of the "host" language. In addition to the small set of primitive operations it provides, RG includes constructs for composing these primitives into routines in a functional style.

RGVs primitives are of two basic kinds. Pointwise primitives consist of common arithmetic and logical operations applied element-wise to array arguments; they involve no communication between different locations. For example, the add operation adds corresponding array elements, resulting in an array of sums. Integration primitives do involve communication; they combine values across sets of locations, e.g., using the scalar ADD, MAX, MIN, AND, or OR operations. Since the meaningful figures and relations in a graphic scene are extended in space, integration primitives are where the action is in image analysis; the choice of these primitives determines which computations are easy or hard to accomplish. RG has six integration primitives:

translate is uniform array translation;

labelcc is connected component labeling;

read is communication between each location and its nearest non-zero neighbor;

spread is accumulation of values within equivalence classes of locations, and distribution of the scalar results within the associated classes;

project is accumulation of values along pixel rows or columns;

global accumulate is accumulation of all values in an array into a single scalar.

The notion of a primitive implies certain time and space cost restrictions. In RG, the run time and space of a primitive is linear in the number of input array locations, on a serial machine. In other words (i) the run time and space of an RG primitive is fixed for a fixed input size; and (ii) run time and space are independent of the content of the input, i.e., independent of the geometry of the input scene. This limits potential integration primitives to operations that are uniform and local in the broad sense that they can be accomplished by moving a small, fixed neighborhood across the input array(s) in a fixed number of passes. Here, a "pass" is any systematic exploration of the input array that visits each location no more than k times, where k is small and fixed a priori.

Computations that are local in this cost-based sense can nevertheless achieve a restricted class of global results through the sequential or hierarchical combination of spatially neighboring values. For example, the implementation of the read primitive is a simple extension of a standard distance transform algorithm that involves scanning the array in raster order, in two passes, examining a five-pixel neighborhood in each pass. The Fourier transform is an example of a result that does not meet the linear time constraint.

RG's primitives together span three realms: the spatial dimensions (2-D), the property dimensions (1-D), and the scalar realm. accumulate and distribute bridge between the 2-D and 1-D realms. To complete our language, we need a global distribute primitive that coerces a scalar into a constant-valued array. global accumulate and global distribute bridge between the 2-D or 1-D realms and the scalar realm. Every other primitive operates either in the 2-D realm alone or in the 1-D realm alone.

There follows a concise formal description of primitives of the RG language.

Notation

In this discussion. arrays are functions of one or two variables, limited to the descrete case, with bounded support. Two-dimensional arrays are of fixed size W ×H. One-dimensional arrays may be taken to be of some fixed size L, although in practice they are of variable size.

Let $\mathbb{Z}_W$=[0.1 ... , W] $\mathbb{Z}_H$=[0.1 ... , H]. Let $\mathbb{Z}$ =[0.1, ... , L], Let R denote the set $\{a: \mathbb{Z}_W \to \mathbb{Z}_H \to \mathbb{R}\}$; let N denote $\{a: \mathbb{Z}_W \times \mathbb{Z}_H \to \mathbb{N}\}$; and let B denote $\{b: \mathbb{Z}_W \times \mathbb{Z}_H \to \{0,1\}\}$. Let $A=\{R \cup B\}$. Similarly, $R_{ID}$ denotes $\{a: \mathbb{Z}_L \to \mathbb{R}\}$, and $B_{ID}$ denotes $\{b: \mathbb{Z} \to \{0,1\}\}$. Let $A_{ID}=\{R_{ID} \cup B_{1D}\}$. Certain primitives involve an elementwise accumulation operator, which is denoted by $\oplus$. For accumulation over an array $a \in A$ or $a \in A_{ID}$. $\oplus \in \{+,\max,\min\}$. For accumulation over an array $b \in B$ or $b \in B_{ID}$. $\oplus \in \{\cup \cap\}$. The primitives will be defined in terms of relations among the individual elements of their input and result arrays. For that the following notation is used. (consider the case of a function f:. →A. for example. We will write f(•)[x,y] to mean g[x,y]. where g=f(•).

The primitives

Label$CC$: $\mathcal{L}: B \to N$. (1)

$\mathcal{L}(b)[x, y] = 0 \equiv b[x, y] = 0$ $\mathcal{L}(b)[x, y] = \mathcal{L}(b)[u, v] \neq 0 \equiv (x, y)$ is four-connected to $(u, v)$ in $b$ (2)

Translate: $T: A \times \mathbb{Z} \times \mathbb{Z} \times A \to A$. (3)

$T(a, u, v, a_b)[x, y] \triangleq$ $$\begin{cases} a[x+u, y+v] & \text{if } x+u < W, y+v < H \\ a_b[x, y] & \text{otherwise} \end{cases}$$

Translate-1D: $T^{1D}: A_{ID} \times \mathbb{Z} \times A_{ID} \to A_{ID}$. (4)

$T^{1D}(a, o, a_b)[i] \triangleq \begin{cases} a[i+o] & \text{if } i+o < L \\ a_b[i] & \text{otherwise} \end{cases}$ Read: $\mathcal{R}: A \times B \to A$. (5)

$\mathcal{R}(a, b)[x, y] \triangleq a[u, v]$,

-continued for $(u, v)$ such that $b[u, v] \neq 0$ closest to $x, y$.

I.e., for some distance function $D$, $D((u, v),(x, y)) \leq D((i, j),(x, y))$ for all $(i, j)$ such that $b[i, j] \neq 0$.

Project: $\mathcal{P}_\oplus: A \times B \times \{(1, 0), (-1, 0), (0, 1), (0, -1)\}$. (6)

$\mathcal{P}_\oplus(a, b, u, v)[x, y] \triangleq$ $$\begin{cases} 0 & \text{if } b[x, y] = 0 \\ \mathcal{P}_\oplus(a, b, u, v)[x+u, y+v] \oplus a[x, y] & \text{otherwise} \end{cases}$$

Project-1D: $\mathcal{P}_\oplus^{1D}: A_{ID} \times B_{ID} \times \{1, -1\}$. (7)

$\mathcal{P}_\oplus^{1D}(a, b, o)[i] \triangleq \begin{cases} 0 & \text{if } b[i] = 0 \\ \mathcal{P}_\oplus^{1D}(a, b, o)[i+o] \oplus a[i] & \text{otherwise} \end{cases}$ Accumulate: $\mathcal{A}_\oplus: A \times N \to A_{ID}$. (8)

$\mathcal{A}_\oplus(a, e)[i] \triangleq \underset{x,y:e[x,y]=i}{\oplus} a[x, y]$ (Algorithmically speaking, for all $u, v, h[e[u, v]] \leftarrow h[e[u, v]]_\oplus a[u, v]$, where $h$ is the output array.)

Distribute: $A_{ID} \times N \to A$. (9)

$\mathcal{D}(a, e)[x, y] \triangleq a[e[x, y]]$

Spread: $\mathcal{S}_\oplus: A \times N \to A$. (10)

$\mathcal{S}_\oplus(a, e)[x, y] \triangleq \underset{u,v:\, e[u,v]=e[x,y]}{\oplus} a[u, v]$ I.e., $\mathcal{S}_\oplus(a, e) \triangleq \mathcal{D}(\mathcal{A}_\oplus(a, e), e)$ (11)

Global accummulate: $\mathcal{G}_\oplus: A \times B \to \mathbb{R}$. (12)

$\mathcal{G}_\oplus \triangleq \underset{x,y:b[x,y] \neq 0}{\oplus} a[x, y]$

The claimed invention is:

1. A method comprising the steps of:
(a) providing a processor with a software program specifying a computation (hereinafter, "the overall computation") including a plurality of operations, each of the operations implying a set of subcomputations without explicitly specifying a control structure for carrying out the subcomputations of said set according to a particular sequencing, the plurality of operations including a first operation and a second operation, the software program further specifying how the first and second operations are combined in the overall computation;
(b) providing a processor with a description of possible sequencings of subcomputations of the first and second operations, to be used in implementing the specified combination of the first and second operations, the description comprising predetermined set of fusibility constraints on the sequencing of subcomputations of the first and second operations; and
(c) generating automatically with a processor a software program including a combined operation, the combined operation implementing the specified combination of the first and second operations, the combined operation having a control structure for carrying out the subcomputations of the first and second operations in accordance with the predetermined set of fusibility constraints.

2. The method of claim 1 wherein the control structure of the combined operation comprises a computational loop.

3. The method of claim 1 wherein the first and second operations each imply, respectively, a first and a second computational loop, the first loop including the subcomputations of the first operation, the second loop including the subcomputations of the second operation, neither the first nor the second operation explicitly specifying a control structure for carrying out the subcomputations of, respectively, the first and second loops according to a particular sequencing.

4. The method of claim 3 wherein the control structure of the combined operation comprises a computational loop including a fusion of the first and second loops.

5. The method of claim 1 wherein:
the provided software program of step (a) is a first program comprising a source code program;
the generated software program of step (c) is a second program; and
the step (c) is performed by executing with the processor of step (c) at least a portion of a language processing program distinct from said first and second programs, the language processing program being a software program for processing a source code program expressed in a programming language, the language processing program accepting the first program as an input and producing the second program as an output.

6. The method of claim 5 wherein the language processing program is selected from the group a compiler, an interpreter, a precompiler, or a preprocessor.

7. The method of claim 1 wherein the description provided in step (b) comprises a set of annotations added by a human user to the provided software program of step (a).

8. The method of claim I wherein the description of step (b) is provided as a general set of instructions, the instructions being applicable to various software programs, including but not limited to the software program provided in step (a).

9. The method of claim 8 wherein the step (c) is performed by executing a language processing program with the processor of step (c), the language processing program incorporating the general set of instructions.

10. The method of claim 1 wherein the predetermined set of fusibility constraints includes at least one constraint selected from the group
a data access order constraint,
a loop organization constraint,
a demand constraint, and
a timing constraint.

11. The method of claim 1 wherein the predetermined set of fusibility constraints includes at least one mandatory constraint and at least one optional constraint.

12. The method of claim 1 wherein step (c) comprises automatically generating a constraint analysis by analyzing the predetermined set of fusibility constraints with the processor to determine if the first and second operations can be combined consistently with the predetermined set of fusibility constraints.

13. The method of claim 1 wherein step (c) comprises the constituent steps of:
generating a first graph representing the overall computation, the first graph having a plurality of nodes, each node of the first graph representing one of the operations of the overall computation, the nodes of the first graph including a first node representing the first operation and a second node representing the second operation;
annotating the first graph to reflect the predetermined set of fusibility constraints;
solving the predetermined set of fusibility constraints to determine a constraint solution representing how the first graph can be transformed, consistently with the predetermined set of fusibility constraints, into a second graph, the second graph having a plurality of nodes including a single node representing a fusion of the first and second operations; and
producing the generated software program of step (c) from the constraint solution thus determined.

14. The method of claim 13 wherein:
the step of generating the first graph comprises generating a set of computational objects each representing a node in the first graph, the set of computational objects including a first object representing the first node and a second object representing the second node; and
the steps of solving the predetermined set of fusibility constraints does not involve generating a computational object representing said single node representing the fusion of the first and second operations.

15. The method of claim 13 wherein:
the generated first graph further comprises a plurality of links representing data flows between operations, the plurality of links including a link between the first and second nodes; and
the step of solving the predetermined set of fusibility constraints comprises determining a set of fusible links from among the plurality of links.

16. The method of claim 13 wherein the step of solving the predetermined set of fusibility constraints comprises performing a unification of constraints of the set.

17. The method of claim 1 wherein:
the first operation has a large-scale operand comprising a plurality of elements, each implied subcomputation of the first operation pertaining to one element of the first operation's operand; and
the second operation has a large-scale operand comprising a plurality of elements, each implied subcomputation of the second operation pertaining to one element of the second operation's operand.

18. The method of claim 1 wherein the provided software program of step (a) is a program expressed in an image-processing language.

19. The method of claim 1 wherein the generated software program of step (c) is selected from the group a source code program or an executable program.

20. The method of claim 1 wherein:
the provided software program of step (a) is a source code program expressed in a programmning language, the language comprising a base language and an extension to the language, the extension comprising an operation not defined in the base language (hereinafter, "the new operation"); and
at least one of the first and second operations is the new operation.

21. A method comprising the step of transmitting information including a software program, the software program being generated according to the method of claim 1 and being identified with the generated software program of step (c) therein.

22. An article of manufacture comprising an information storage medium wherein is stored information including a software program, the software program being generated according to the method as recited in claim 1 and being identified with the generated software program of step (c) therein.

23. An article of manufacture comprising an information storage medium wherein is stored information comprising a third software program for facilitating automatic generation by a processor of a second software program from a first software program and a sequencing description, the first software program specifying a computation (hereinafter, "the overall computation") including a plurality of operations, each of the operations implying a set of subcomputations without explicitly specifying a control structure for carrying out the subcomputations of said set according to a particular sequencing, the plurality of operations including a first operation and a second operation, the software program further specifying how the first and second operations are combined in the overall computation, the sequencing description being a description of possible sequencings of subcomputations of the first and second operations, to be used in implementing the specified combination of the first and second operations, the description comprising a predetermined set of fusibility constraints on the sequencing of subcomputations of the first and second operations, the second software program being generated automatically by the processor under control of the third software program, the second software program including a combined operation, the combined operation implementing the specified combination of the first and second operations, the combined operation having a control structure for carrying out the subcomputations of the first and second operations in accordance with the predetermined set of fusibility constraints.

24. The article of manufacture as recited in claim 23 wherein the third software program comprises a language processing program for processing a source code program expressed in a programming language, the first software program comprising such a source code program, the language processing program accepting the first software program as an input and producing the second software program as an output.

25. The article of manufacture as recited in claim 24 wherein the language processing program is selected from the group a compiler, an interpreter, a precompiler, or a preprocessor.

26. The article of manufacture as recited in claim 24 wherein:

the first software program is a source code program expressed in a programming language, the language comprising a base language and an extension to the language, the extension comprising an operation not defined in the base language (hereinafter, "the new operation"); and at least one of the first and second operations is the new operation.

27. Apparatus comprising:

a processor;

an instruction store, coupled to the processor, comprising an article of manufacture as recited in claim 23; and a data store, coupled to the processor, wherein the first and second software programs and the sequencing description can be stored.

28. A method comprising the steps of:

(a) providing a processor with a description of a source code programming language, the language including a plurality of operations, each operation implying a set of subcomputations without explicitly specifying a control structure for carrying out the subcomputations of said set according to a particular sequencing;

(b) providing a processor with a description of possible sequencings of the subcomputations of each of the operations of the plurality, to be used in implementing combinations of these operations, the description of this step (b) comprising a predetermined set of fusibility constraints on the sequencing of subcomputations of each of the operations of the plurality;

(c) extending the language by providing a processor with a description of an extension to the source code language, the extension comprising an operation not included in the plurality of operations (hereinafter, "the new operation"), the new operation implying a set of subcomputations without explicitly specifying a control structure for carrying out the subcomputations of the new operation according to a particular sequencing;

(d) providing a processor with a description of possible sequencings of subcomputations of the new operation of the language, to be used in implementing combinations of the new operation with operations of the plurality, the description not explicitly relating the possible sequencings of subcomputations of the new operation to the possible sequencings of subcomputations of the operations of the plurality, the description of this step (d) comprising the predetermined set of fusibility constraints on the sequencing of subcomputations of the new operation;

(e) providing a processor with a software program expressed in the language as extended, the program specifying a computation (hereinafter, "the overall computation") including first and second operations, the first operation being an operation of the plurality of operations, the second operation being the new operation, the software program further specifying how the first and second operations are combined in the overall computation; and (f) from the software program and the descriptions thus provided in the above-recited steps, generating automatically with a processor a software program including a combined operation, the combined operation implementing the specified combination of the first and second operations, the combined operation having a control structure for carrying out the subcomputations of the first and second operations in accordance with the constraints.

\* \* \* \* \*